United States Patent [19]
Walker et al.

[11] Patent Number: 5,555,250
[45] Date of Patent: Sep. 10, 1996

[54] DATA ERROR DETECTION AND CORRECTION SYSTEM

[75] Inventors: William J. Walker, Houston; Alan L. Goodrum, Tomball; Dale J. Mayer, Houston, all of Tex.

[73] Assignee: Compaq Computer Corporation, Houston, Tex.

[21] Appl. No.: 323,263

[22] Filed: Oct. 14, 1994

[51] Int. Cl.[6] ................................................. H03M 13/00
[52] U.S. Cl. ........................................ 371/40.1; 371/40.4
[58] Field of Search ................................ 371/40.1, 40.4, 371/49.1, 53; 395/185.05

[56] References Cited

U.S. PATENT DOCUMENTS

| | | | |
|---|---|---|---|
| 4,201,337 | 5/1980 | Lewis et al. | 371/37 |
| 4,730,320 | 3/1988 | Hidaka et al. | 371/38.1 |
| 4,740,968 | 4/1988 | Aichelmann, Jr. | 371/3 |
| 4,993,028 | 2/1991 | Hillis | 371/39.1 |
| 5,056,095 | 10/1991 | Horiguchi et al. | 371/40.1 |
| 5,206,865 | 4/1993 | Gruender, Jr. et al. | 371/40.1 |
| 5,291,498 | 3/1994 | Jackson et al. | 371/40.1 |

OTHER PUBLICATIONS

IBM® Technical Disclosure Bulletin, vol. 26 No. 10A Mar. 1984.
*Codes for High–Speed Memories II: Byte Error Correcting/Detecting Codes,* ©1989 by T. R. N. Rao and E. Fujiwara, Published by Prentice–Hall, Inc.

*Primary Examiner*—Paul P. Gordon
*Attorney, Agent, or Firm*—Pravel, Hewitt, Kimball & Krieger

[57] ABSTRACT

A system that performs error correction and detection of data read from memory in a computer system having a processor bus and a system bus. A pair of data buffers are used to interface between the memory and the processor data bus or the system data bus. Each data buffer receives half the data bits from the memory array, from the processor data bus, and from the system data bus. Each of the data buffers contains logic for performing error detection and correction. To enable error correction, check bits are generated by the data buffers in a write cycle to the memory. A feature of the present invention is that half the check bits are provided to one data buffer and the second half is provided to other data buffer. When a memory read cycle is performed, the retrieved check bits and data bits are examined according to the error correction algorithm to determine if a single bit correctable error has occurred. If so, the erroneous data bit is flipped. If a multiple bit error is detected, the microprocessor is interrupted to take appropriate remedial actions.

23 Claims, 10 Drawing Sheets

FIGURE 8A
TABLE 1

| SYNDROME [7:0] | FIXBIT [63:0] | MD BIT | BINER |
|---|---|---|---|
| 0x00 | 0x0000000000000000 | NO ERROR | - |
| 0x01 | 0x0000000000000000 | MD PAR 6 | SLAVE |
| 0x02 | 0x0000000000000000 | MD PAR 7 | SLAVE |
| 0x04 | 0x0000000000000000 | MD PAR 2 | SLAVE |
| 0x07 | 0x0000000000001000 | MD BIT 60 | SLAVE |
| 0x08 | 0x0000000000000000 | MD PAR 3 | SLAVE |
| 0x0B | 0x0000000200000000 | MD BIT 33 | MASTER |
| 0x0D | 0x0000000000002000 | MD BIT 61 | SLAVE |
| 0x0E | 0x0000000100000000 | MD BIT 32 | MASTER |
| 0x10 | 0x0000000000000000 | MD PAR 4 | MASTER |
| 0x13 | 0x0000000000000001 | MD BIT 48 | SLAVE |
| 0x15 | 0x0000000000010000 | MD BIT 16 | SLAVE |
| 0x16 | 0x0001000000000000 | MD BIT 0 | MASTER |
| 0x19 | 0x0000000001000000 | MD BIT 24 | SLAVE |
| 0x1A | 0x0000000000100000 | MD BIT 20 | SLAVE |
| 0x1C | 0x0000000000000010 | MD BIT 52 | SLAVE |
| 0x1F | 0x0100000000000000 | MD BIT 8 | MASTER |
| 0x20 | 0x0000000000000000 | MD PAR 5 | MASTER |
| 0x23 | 0x0000000000000002 | MD BIT 49 | SLAVE |
| 0x25 | 0x0000000000020000 | MD BIT 17 | SLAVE |
| 0x26 | 0x0002000000000000 | MD BIT 1 | MASTER |
| 0x29 | 0x0000000002000000 | MD BIT 25 | SLAVE |
| 0x2A | 0x0000000000200000 | MD BIT 21 | SLAVE |
| 0x2C | 0x0000000000000020 | MD BIT 53 | SLAVE |
| 0x2F | 0x0200000000000000 | MD BIT 9 | MASTER |
| 0x31 | 0x0000100000000000 | MD BIT 44 | MASTER |
| 0x32 | 0x0000200000000000 | MD BIT 45 | MASTER |

FIGURE 8B
TABLE 1

| SYNDROME [7:0] | FIXBIT [63:0] | MD BIT | BINER |
|---|---|---|---|
| 0x34 | 0x0000400000000000 | MD BIT 46 | MASTER |
| 0x38 | 0x0000800000000000 | MD BIT 47 | MASTER |
| 0x40 | 0x0000000000000000 | MD PAR 0 | MASTER |
| 0x43 | 0x0000000000000004 | MD BIT 50 | SLAVE |
| 0x45 | 0x0000000000040000 | MD BIT 18 | SLAVE |
| 0x46 | 0x0004000000000000 | MD BIT 2 | MASTER |
| 0x49 | 0x0000000004000000 | MD BIT 26 | SLAVE |
| 0x4A | 0x0000000000400000 | MD BIT 22 | SLAVE |
| 0x4C | 0x0000000000000040 | MD BIT 54 | SLAVE |
| 0c4F | 0x0400000000000000 | MD BIT 10 | MASTER |
| 0x51 | 0x0C0000010000C000 | MD BIT 28 | SLAVE |
| 0x52 | 0x0000000020000000 | MD BIT 29 | SLAVE |
| 0x54 | 0x0000000040000000 | MD BIT 30 | SLAVE |
| 0x58 | 0x0000000080000000 | MD BIT 31 | SLAVE |
| 0x61 | 0x0000000000000100 | MD BIT 56 | SLAVE |
| 0x62 | 0x0000000000000200 | MD BIT 57 | SLAVE |
| 0x64 | 0x0000000000000400 | MD BIT 58 | SLAVE |
| 0x68 | 0x0000000000000800 | MD BIT 59 | SLAVE |
| 0x70 | 0x0000000000004000 | MD BIT 62 | SLAVE |
| 0x80 | 0x0000000000000000 | MD PAR 1 | MASTER |
| 0x83 | 0x0000000000000008 | MD BIT 51 | SLAVE |
| 0x85 | 0x0000000000080000 | MD BIT 19 | SLAVE |
| 0x86 | 0x0008000000000000 | MD BIT 3 | MASTER |
| 0x89 | 0x0000000008000000 | MD BIT 27 | SLAVE |
| 0x8A | 0x0000000000800000 | MD BIT 23 | SLAVE |
| 0x8C | 0x0800000000000080 | MD BIT 55 | SLAVE |
| 0x8F | 0x0800000000000000 | MD BIT 11 | MASTER |

FIGURE 8C
TABLE 1

| SYNDROME [7:0] | FIXBIT [63:0] | MD BIT | BINER |
|---|---|---|---|
| 0x91 | 0x0000001000000000 | MD BIT 36 | MASTER |
| 0x92 | 0x0000002000000000 | MD BIT 37 | MASTER |
| 0x94 | 0x0000004000000000 | MD BIT 38 | MASTER |
| 0x98 | 0x0000008000000000 | MD BIT 39 | MASTER |
| 0xA1 | 0x0000010000000000 | MD BIT 40 | MASTER |
| 0xA2 | 0x0000020000000000 | MD BIT 41 | MASTER |
| 0xA4 | 0x0000040000000000 | MD BIT 42 | MASTER |
| 0xA8 | 0x0000080000000000 | MD BIT 43 | MASTER |
| 0xB0 | 0x0000000800000000 | MD BIT 35 | MASTER |
| 0xC1 | 0x0010000000000000 | MD BIT 4 | MASTER |
| 0xC2 | 0x0020000000000000 | MD BIT 5 | MASTER |
| 0xC4 | 0x0040000000000000 | MD BIT 6 | MASTER |
| 0xC8 | 0x0080000000000000 | MD BIT 7 | MASTER |
| 0xD0 | 0x0000000000008000 | MD BIT 63 | SLAVE |
| 0xE0 | 0x0000000400000000 | MD BIT 34 | MASTER |
| 0xF1 | 0x1000000000000000 | MD BIT 12 | MASTER |
| 0xF2 | 0x2000000000000000 | MD BIT 13 | MASTER |
| 0xF4 | 0x4000000000000000 | MD BIT 14 | MASTER |
| 0xF8 | 0x8000000000000000 | MD BIT 15 | MASTER |

DATA ERROR DETECTION AND CORRECTION SYSTEM

BACKGROUND OF THE INVENTION

1. FIELD OF THE INVENTION

The invention relates to error detection and correction systems, and more particularly, to an error detection and correction circuit for storage and retrieval of data in computer memories.

2. DESCRIPTION OF THE RELATED ART

In a computer system, data transmitted to and from the memory can be erroneous due to a variety of factors, such as faulty components, inadequate design tolerances and noise in the communications channel or bus. As the size of the memory increases, more components are present and subject to failure, and the mean time between failures usually diminishes. Thus, in a large memory system, the potential frequency of errors becomes a significant hazard and the errors are almost impossible to prevent.

To prevent corrupted data from being used, computer manufacturers incorporate error detection and correction circuitry into computer memory systems. Numerous methods have been developed and implemented, but the simplest and most well known error detection code is a single bit parity code. To implement a parity code, a single bit is appended to the end of the data word stored in the memory. For even parity systems, the value of the parity bit is assigned so that the total number of "1"s in the stored word including the parity bit is even. For odd parity, the parity bit is assigned so that the total number of "1"s is odd. When the stored word is read, if one of the bits is erroneous, the desired parity will not be achieved. The parity error is detected by comparing the stored parity bit in the memory to a regenerated check bit calculated for the data word as it is retrieved from the memory.

One of the limitations of using the single bit parity code is that only single bit read errors can be detected. For example, if a two-bit error occurs, the parity value for the data remains the same as the stored parity bit because the total number of "1"s in the word stays odd or even. In addition, even though an error may be detected, the single bit parity code cannot determine which bit is erroneous and therefore cannot correct the error.

To provide error correction and more effective error detection, various error correction codes were developed which not only determine that an error has occurred, but also indicate which bit is erroneous. The most well known error correction method is the Hamming code. Many variations of the Hamming code have been developed. Basically, the Hamming code involves appending a series of check bits to the data word as it is being stored into the memory. When a data word is read, the retrieved check bits are compared to regenerated check bits calculated for the retrieved data word. The results of the comparison indicates whether an error has occurred and if so which bit is erroneous. By inverting the erroneous bit, the error is corrected. In addition, a Hamming code can detect two bit errors, which would escape detection under a single bit parity system.

In the Hamming code, the number of check bits represented as C required to achieve single error correction for an N-bit data word is calculated according to Equation 1. Thus, for a 16-bit data word, i.e., N=16, the number of check bits required must be greater than or equal to 5.

$$K \geq LOG_2(N+K) \quad (1)$$

For a 32-bit data word, the number of check bits required must be greater than or equal to 6. For a 64-bit data word, the number of check bits required must be greater than or equal to 7.

In high performance computer systems, the data width of the memory array typically varies between 32, 64, 128 or more bits. With the advent of such processors as the Pentium Microprocessor from Intel Corporation, which is a 64-bit microprocessor, the desired minimum memory data width is 64 bits. Generally, in high performance computer systems, data is transferred between the memory array and the microprocessor through data buffers, which are typically implemented with ASICs. The use of ASICs allow the data registers to be located on the same chip with associated circuitry which perform multiplexing, parity checking and error correction functions. However, due to the large data width of the memory array, multiple ASICs are utilized to reduce the number of pins required on the ASICs. This is done to reduce cost as ASICs with larger pin counts are generally much more expensive then ASICs with lower pin counts.

Thus, if the data buffer is implemented with two or more chips, each chip must include its own error correction circuitry. Because the error correction code algorithm is developed for a predefined memory data width, the straightforward solution would be to have each data buffer chip provide and receive all of the check bits to perform the proper error correction and detection function. However, having to provide all of the check bits to each individual data buffer chip increases the number of I/O pins required on the chips. In addition, extra loading is placed on the check bits. Therefore, an alternative method of implementing the error correction circuitry is desired that would reduce the number of pins required on the data buffer chips and that would not place extra loading on the check bit signals.

SUMMARY OF THE PRESENT INVENTION

The system according to the present invention divides the error correction check bits associated with a memory data word among a plurality of data buffer chips. In the preferred embodiment, two data buffer chips are utilized for a memory array having a data width of N. The number of check bits for the data word is C. Thus, each data buffer chip receives and transmits N/2 data bits and C/2 check bits from and to the memory array. Each data buffer chip includes error correction logic that generates partial error correction code based on the N/2 data bits and C/2 check bits. The partial error correction code generated by each data buffer is provided to the other buffer to enable full correction of the N/2 data bits in each data buffer as needed. Thus, the error correction system according to the preferred embodiment of the present invention reduces the number of signals that need to be routed to each data buffer by C/2 bits. Further, loading on the check bits is reduced since each check bit is connected to only one data buffer chip.

BRIEF DESCRIPTION OF THE DRAWINGS

A better understanding of the present invention can be obtained when the following detailed description of the preferred embodiment is considered in conjunction with the following drawings, in which:

FIGS. 8A, 8B, and 8C are a table of fix bits generated for all the possible single bit data errors, wherein the fix bits are used to perform the data correction.

DETAILED DESCRIPTION OF THE PREFERRED EMBODIMENT

The following disclosures are hereby incorporated by reference:

U.S. application Ser. No. 08/324,016, entitled "Single Bank, Multiple Way Cache Memory," by Sompong P. Olariz, Jens K. Ramsey, and Michael J. Collins, filed Oct. 14, 1994;

U.S. application Ser. No. 08/324,246, entitled "Memory Controller With Write Posting Queues for Processor and I/O Bus Operations and Ordering Logic for Controlling the Queues," by Michael J. Collins, Gary W. Thome, Michael Moriarty, Jens K. Ramsey, and John E. Larson, filed Oct. 14, 1994;

U.S. application Ser. No. 08/324,020, entitled "Circuit for Invalidating Portions of a Cache Memory if a Write Occurs to a Write Protected Area of Main Memory" by Jens K. Ramsey, filed Oct. 14, 1994;

U.S. application Ser. No. 08/323,110, entitled "Circuit for Placing a Cache Memory Into Low Power Mode in Response to Special Bus Cycles," by Jens K. Ramsey, and Jeffrey C. Stevens, filed Oct. 14, 1994; and U.S. application Ser. No. 08/324,011, entitled "System for Arbitrating Access to Memory" by John E. Larson, Michael Moriarty, Michael J. Collins and Gary W. Thome, filed Oct. 14, 1994; all of which are assigned to the assignee of this invention.

Figure 1:
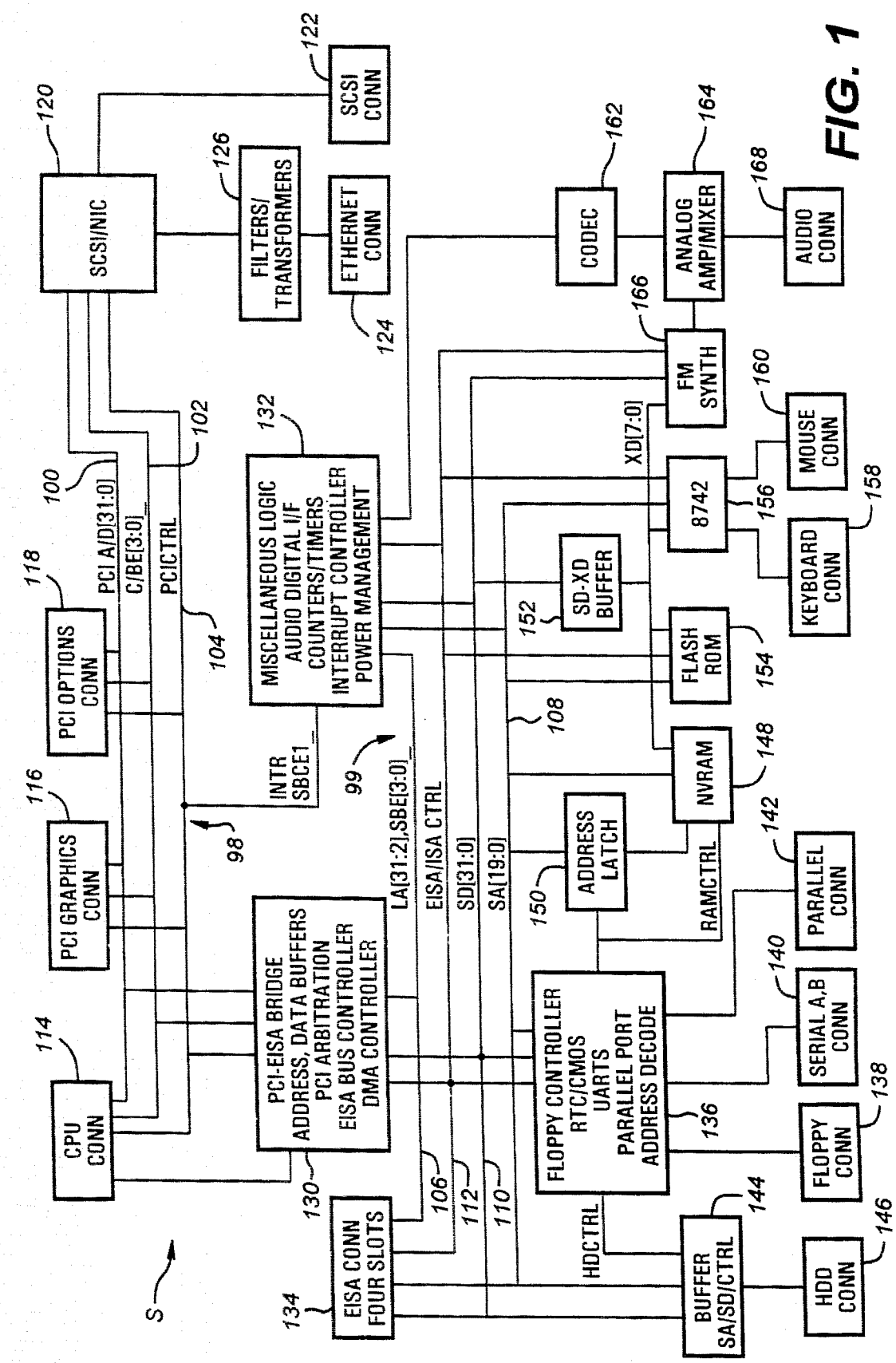
FIG. 1 is a block diagram of a system board located in an exemplary computer system.

Referring now to FIG. 1, the system board S of an exemplary computer system incorporating the preferred embodiment of the present invention is shown. In the preferred embodiment, the system board S contains circuitry and slots for receiving interchangeable circuit boards. In the preferred embodiment, there are two primary buses located on the system board S. The first bus is the PCI or Peripheral Component Interconnect bus 98 which includes address/data portion 100, also referred to as PCIAD, control and byte enable portion 102 and control signal portion 104. The address/data bus PCIAD is preferably 32 bits wide, although it can be upgraded to 64 bits if desired. The second primary bus on the system board S is the EISA bus 99. The EISA bus 99 includes LA address portion 106, SA address portion 108, SD data portion 110 and EISA/ISA control signal portion 112. The PCI and EISA buses 98 and 99 form the backbones of the system board S.

Figure 2:
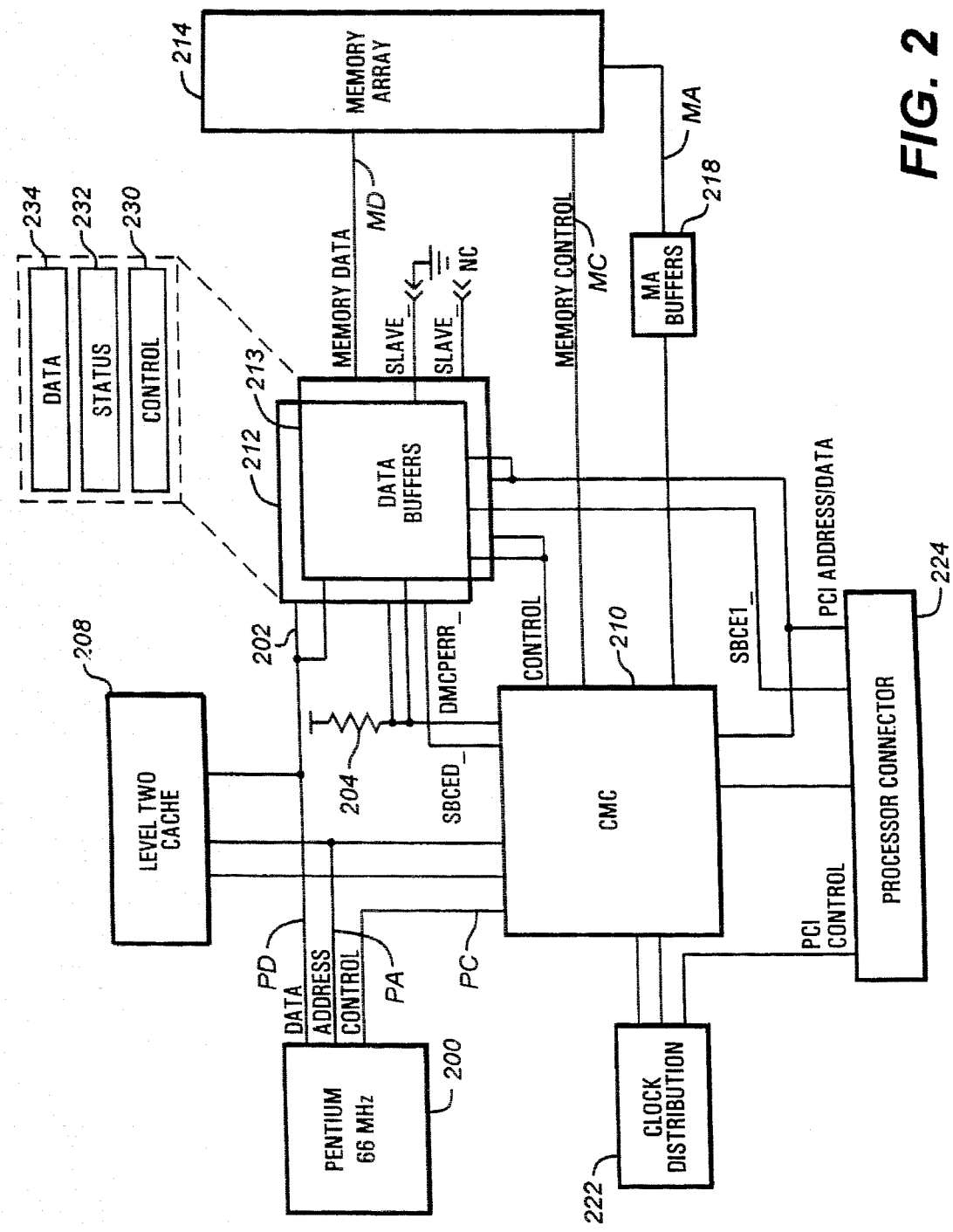
FIG. 2 is a block diagram of a processor board for connecting to the system board of FIG. 1 and incorporating the error detection and correction circuit according to the present invention.

A CPU connector 114 is Connected to the PCI bus 98 to receive a processor card, such as that shown in FIG. 2. A PCI graphics connector 116 is connected to the PCI bus 98 to receive a video graphics card (not shown). A PCI option connector 118 is also connected to the PCI bus 98 to receive any additional cards designed according to the PCI standard. In addition, a SCSI and network interface (NIC) controller 120 is connected to the PCI bus 98. Preferably, the controller 120 is a single integrated circuit and 30 includes the capabilities necessary to act as a PCI bus master and slave and the circuitry to act as a SCSI controller and an Ethernet interface. A SCSI connector 122 is connected to the controller 120 to allow connection of various SCSI devices, such as hard disk drives and CD-ROM drives. An Ethernet connector 124 is provided on the system board S and is connected to filter and transformer circuitry 126, which in turn is connected to the controller 120. This forms a network or Ethernet connection for connecting the system boards and computer to a local area network (LAN).

A PCI-EISA bridge 130 is provided to convert signals between the PCI bus 98 and the EISA bus 99. The PCI-EISA bridge 130 includes the necessary address and data buffers and latches, arbitration and bus master control logic for the PCI bus, EISA arbitration circuitry, an EISA bus controller as conventionally used in EISA systems and a DMA controller. Preferably the PCI-EISA bridge 130 is a single integrated circuit, but other combinations are possible. A miscellaneous system logic chip 132 is connected to the EISA bus 99. In the preferred embodiment, the miscellaneous system logic chip 132 is implemented as an ASIC. The miscellaneous system logic chip 132 contains a digital audio interface, counters and timers as conventionally present in personal computer systems, an interrupt controller for both the PCI and EISA buses 98 and 99 and power management logic, as well as other miscellaneous circuitry.

A series of four EISA slots 134 are connected to the EISA bus 99 to receive ISA and EISA adapter cards. A combination I/O chip 136 is connected to the EISA bus 30 99. The combination I/O chip 136 preferably includes a floppy disk controller, real time clock (RTC)/CMOS memory, two UARTs, a parallel port and various address decode logic. A floppy disk connector 138 for receiving a cable to a floppy disk drive is connected to the combination I/O chip 136. A pair of serial port connectors are also connected to the combination I/O chip 136, as is a parallel port connector 142. A buffer 144 is connected to both the EISA bus 99 and the combination I/O chip 136 to act as a buffer between the EISA bus 99 and a hard disk drive connector 146 to allow connection of an IDE-type hard disk drive (not shown). A non-volatile random access memory (NVRAM) 148 is connected to the EISA bus 99 and receives its control signals from the combination I/O chip 136. An address latch 150 is connected to the EISA bus 99 and controlled by the combination I/O chip 136 to provide additional addressing capability for the NVRAM 148. Preferably the NVRAM 148 is used to contain certain system information. A data buffer 152 is connected to the SD portion of the EISA bus 99 to provide an additional data bus XD for various additional components of the computer system. The NVRAM 148 is connected to the XD data bus to receive its data bits. A flash ROM 154 receives its control and address signals from the EISA bus 99 and is connected to the XD bus for data transfer. Preferably, the flash ROM 154 contains the BIOS information for the computer system and can be reprogrammed to allow for revisions of the BIOS. An 8742 or keyboard controller 156 is connected to the XD bus and EISA address and control portions 108 and 112. The keyboard controller 156 is of conventional design and is connected in turn to a keyboard connector 158 and a mouse or pointing device connector 160.

The computer system of the preferred embodiment also includes audio capabilities. To this end a CODEC chip 162 is connected to the miscellaneous system logic chip 132 and to an analog amplifier and mixer chip 164. An FM synthesizer chip 166 is connected to the analog amplifier and mixer 164 and receives digital information from the XD bus. The FM synthesizer 166 is also connected to the control and data portions 110 and 112 of the EISA bus 99 and is controlled by the miscellaneous system logic chip 132. An audio connector 168 is provided to allow external audio connections to the computer and is connected to the outputs and inputs of the analog amplifier and mixer 164.

Referring now to FIG. 2, a processor board P for use with the system board S is shown. In the processor board P, the CPU or microprocessor 200 is preferably a 64-bit Pentium P54 processor from Intel, preferably operating at 50 or 60 MHz. The microprocessor 200 can also be substituted with a 32-bit Pentium P24 processor or a 32-bit 486 DX4 processor, also from Intel. The Pentium P24 processor preferably operates at 50 MHz and the 486 DX4 preferably operates at 33 MHz. The microprocessor 200 provides a processor bus 202 having data, address and control portions PD, PA and PC. When used with the Pentium P54 processor, the width of the data bus PD is 64 bits. With the P24 or 486 processors, the data width of the bus PD is 32 bits. A level 2 (L2) or external cache memory system 208 is connected to the processor bus 202 to provide additional caching capabilities to improve performance of the computer system. A processor cache and memory controller (CMC) and PCI bridge chip 210 is connected to the control portion PC and to the address portion PA. The CMC 210 is connected to the L2 cache memory 208 as it incorporates the cache controller and therefore controls the operations of the cache memory devices in the L2 cache system 208. The CMC 210 also provides various control signals to data buffers 212 and 213. Additionally, the CMC 210 provides control signals MC and address signals NLA to the main memory 214. The control signals MC include RAS* and CAS* signals for multiplexing the processor address bus PA or the PCI address bus PCIAD onto the 12-bit memory address bus MA.

The data buffers 212 and 213, which are preferably implemented with ASICs, are connected between the processor data bus PD and the memory data bus MD from the memory array 214. The data buffers 212 and 213 are also connected to the PCI address and data bus PCIAD through a connector 224, which is provided to be mateably received by the processor connector 114. The data buffers 212 and 213 are connected to various control signals from the CMC 210. The data buffers 212 and 213 each provide a signal DMCPERR_, which are tied together and provided to the DMCPERR_ input of the CMC 210. When a data error condition is detected by one or both of the data buffers 212 and 213, the signal DMCPERR_ is driven low by the respective data buffer. If no error condition exists, the DMCPERR_ outputs from the data buffers 212 and 213 are tristated. A pullup resistor 204 connected to the signal DMCPERR_ pulls the signal DMCPERR_ high when no data error is detected. A signal SBCE0_ is provided by the data buffer 212 to the CMC 210 to indicate when a single bit correctable error has occurred. The data buffer 213 provides a signal SBCE1_ to the processor connector 224 to notify the miscellaneous logic chip 132 that a single bit correctable error has occurred. As discussed above, the miscellaneous logic chip 132 includes an interrupt controller. In response to the assertion of the signal SBCE1_, the miscellaneous logic chip 132 interrupts the microprocessor 200 via a hardware interrupt signal INTR.

The data buffers 212 and 213 each also include a SLAVE_ input. As shown, the SLAVE_ input to the data buffer 212 is tied to ground and the SLAVE_ input of the data buffer 213 is not connected, the input being pulled high by an internal pullup resistor. Thus, the data buffer 212 is referred to as the slave data buffer, and the data buffer 213 is referred to as the master data buffer. Each data buffer receives half the data bits from the processor, memory and PCI data buses PD, MD, and PCIAD, respectively.

The Pentium P54 microprocessor 200 provides 8 parity bits PDP[7:0] to the data buffers 212 and 213 for detection of parity errors in the 8 bytes of processor data PD[63:0]. For the 32-bit microprocessors, 4 parity bits PDP[3:0] are provided for the 4 bytes of processor data PD[31:0]. The memory array 214 stores 8 check bits MDP[7:0] for its 64-bit memory data bus MD. It is noted at this point that the data buffers 212 and 213 are capable of performing in two modes: a parity mode and an error correction code (ECC) mode. In parity mode, each of the bits MDP[7:0] are used to detect a parity error in a corresponding byte of memory data MD. In ECC mode, the bits MDP[7:0] are the check bits utilized to perform single bit error correction and multiple bit error detection.

Clock distribution and generation circuitry 222 is associated with the processor card P and is connected to the CMC 210. The processor connector 224 is connected to the CMC 210 and the clock distribution circuitry 222 to provide clocks to the computer system and to provide a PCI interface to allow the microprocessor 200 to access the PCI and EISA buses 98 and 99 and to allow PCI and EISA bus masters to access the main memory array 214. The PCI address and data are multiplexed on the bus PCIAD. During the address phase of a PCI cycle, the address is provided to the CMC 210 through the bus PCIAD. During the data phase, data are provided to the data buffers 212 and 213 through the bus PCIAD.

Each of the data buffers 212 and 213 includes 16-bit control, status, and data registers located in the PCI configuration address space. The PCI bus standard provides for separate configuration cycles to allow the computer system to initialize and configure its components. For more detail on PCI configuration cycles, refer to the PCI Specification 2.0 from the PCI Special Interest Group in care of Intel Corporation, which is hereby incorporated by reference. The registers are logically combined as 32-bit control, status and data registers 230, 232 and 234, respectively. The lower halves of the registers 230, 232 and 234 correspond to the data buffer 212 and the upper halves correspond to the data buffer 213. To perform a write to the write-only control register 230, a PCI configuration write command cycle is executed. To read the read-only status and data registers 232 and 234, a PCI configuration read cycle is executed. To indicate the type of PCI cycle being performed, the CMC 210 provides decode signals PCIDCD[3:0] to the data buffers 212 and 213. A configuration read is preferably indicated by the value of the signals PCIDCD[3:0] being equal to 0×D and a configuration write is preferably indicated by the value of PCIDCD[3:0] equal to 0×E.

Setting the following bits in the control register 230 causes the following function. Bits 0 and 16 cause the signals SBCE1_ and SBCE0_, respectively, to be reset. Bits 1 and 17 cause internal multiple error indicating flags in the data buffers 212 and 213, respectively, to be reset. Setting bits 2 and 18 places the data buffers 212 and 213, respectively, into ECC mode. Setting bits 3 and 19 place the data buffers 212 and 213 into parity mode. If bits 4 and 20 of the control register 230 are set, the ECC logic is disabled.

The remaining bits of the control register 230 perform other functions.

The bits of the status register 232 perform the following indications. Bits 0 and 16 of the status register 232 indicate whether a single bit correctable error has occurred in the respective data buffers 212 and 213. Bits 1 and 17 indicate a multiple bit uncorrectable error, bits 2 and 18 indicate if a parity error has occurred, bits 3 and 19 indicate either ECC mode or parity mode, and bits 4 and 20 are used to indicate whether the ECC logic has been disabled. The remaining status register 232 bits are used for other functions.

The data register 234 is accessed via a PCI configuration read to obtain parity check bits associated with a parity error on the processor bus PD. The data register 234 also contains memory check bits associated with a parity error on the memory bus MD, if the data buffers 212 and 213 are in parity mode. If in ECC mode, the data register 234 contains syndrome bits computed for the correction of the memory data bits MD for a single bit error. The remaining bits of the data register 234 are used for other functions.

Figure 3:
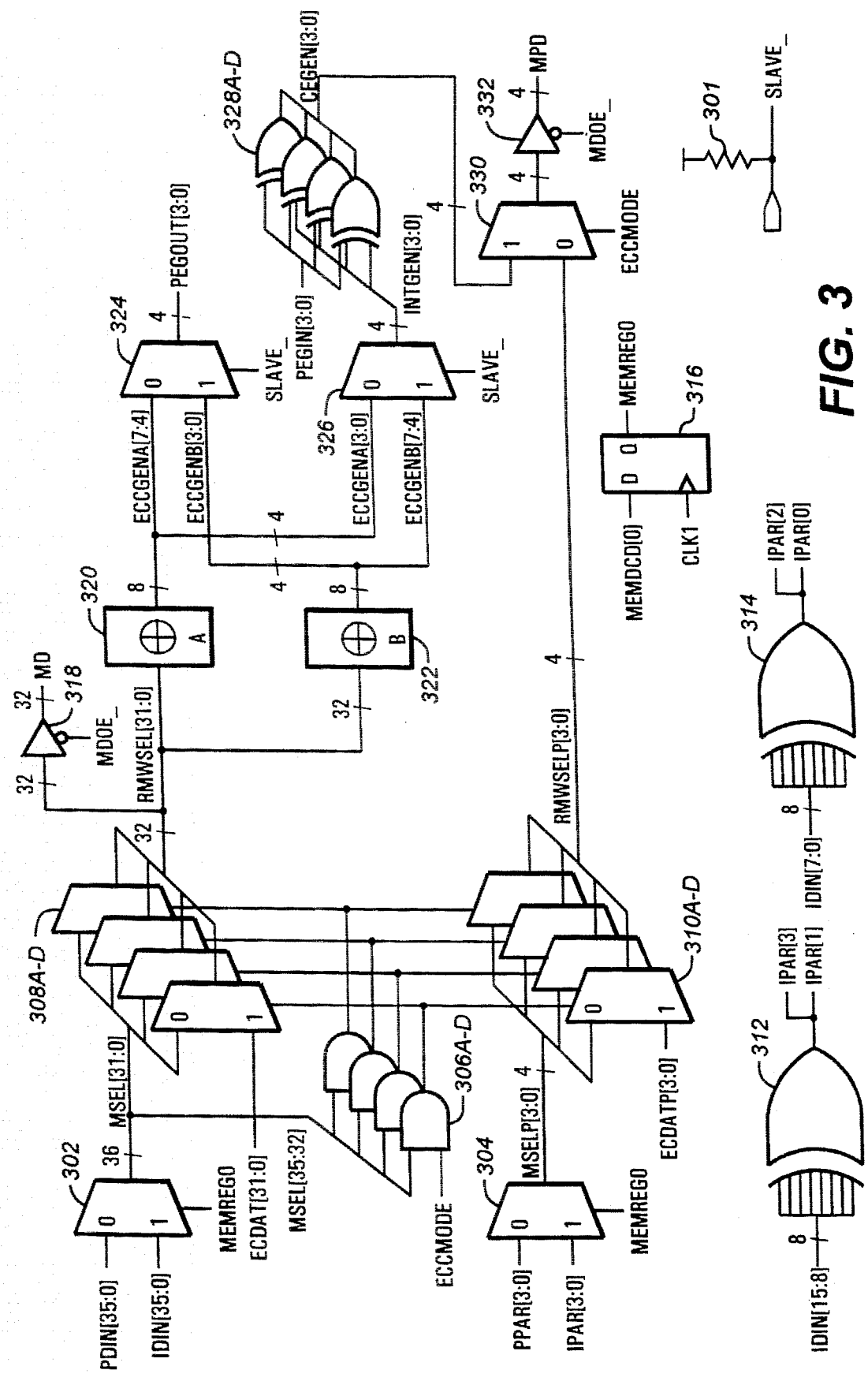
FIG. 3 is a schematic diagram of a check bit generator.

Referring now to FIG. 3, logic in each of the data buffers 212 and 213 is shown for generating check bits during a write to the memory array 214. The internal logic of the master and slave data buffers 212 and 213 are identical except that the state of the SLAVE_ input is grounded low in the slave data buffer 212 and pulled high in the master data buffer 213. A pullup resistor 301 is connected to an input pad 300 that provides the SLAVE_ input. In the slave data buffer 212, the SLAVE_ input is connected to ground externally. For the master data buffer 213, the SLAVE_ input is unconnected, allowing the pullup resistor 301 to pull the signal SLAVE_ high.

A multiplexor 302 selects between the processor data bus PD and the PCI data bus PCIAD. The 0 input of the multiplexor 302 is connected to signals PDIN[35:0] corresponding to the processor bus PD and the 1 input is connected to signals IDIN[35:0] corresponding to the PCI bus PCIAD. In the preferred embodiment, a P2M queue is provided to queue processor-to-memory write requests and an I2M queue is provided to queue PCI-to-memory write requests. For purposes of this description, the signals PDIN [35:0] come from the P2M queue and the signals IDIN[35:0] come from the I2M queue. For more detail on the data path between the processor data bus PD, the PCI data bus PCIAD, and the memory data bus MD, refer to Patent Application entitled "Memory Controller With Write Posting Queues for Processor and I/O Bus Operations and Ordering Logic for Controlling the Queues," filed concurrently herewith, which is hereby incorporated by reference.

In the slave data buffer 212, if a 64-bit microprocessor 200 is used, the signals PDIN[35:32] correspond to processor byte enable signals PBE[3,2,7,6]_. The signals PDIN [31:16] correspond to the processor data bits PD[31:16] and the signals PDIN[15:0] correspond to the processor data bits PD[63:48]. In the master data buffer 213, the signals PDIN [35:0] correspond to byte enable signals PBE[1,0,5,4]_, processor data bits PD[15:0] and processor data bits PD[47:32], respectively.

If a 32-bit microprocessor 200 is used instead, then the upper half data inputs PD[63:32] and byte enable inputs PBE[7:4]_ of the data buffers 212 and 213 are externally connected to the lower half data bits PD[31:0] and byte enable bits PBE[3:0]_, respectively. This is done so that the processor data PD[31:0] can be properly routed to the appropriate half of the memory data MD[63:0] as determined from the processor address bit PA[2]. In the preferred embodiment, eight CASm* signals, m ranging from 0 through 7, are provided to control writes to the 8 bytes of memory data MD. For a 64-bit processor data bus PD, byte enable bits PBE[7:0]_ determine which of the CASm* signals are asserted low in parity mode. For a 32-bit processor, processor address bit PA[2] and PCI address bit PCIAD[2], along with the corresponding byte enable signals PBE[3:0]_ and PCIBE[3:0]_, determine which CASm* signals are active. The signals PDIN[35:0] correspond to byte enable bits PBE[3,2,3,2]_, data bits PD[31:16], and data bits PD[31:16], respectively, in the slave data buffer 212. In the master data buffer 213, the signals PDIN[35:0] correspond to byte enable bits PBE[1,0,1,0]_, data bits PD[15:0], and data bits PD[15 0], respectively.

The PCI data bus PCIAD[31:0] is also preferably 32 bits wide, with the upper half bits PCIAD[31:16] being received by the slave data buffer 212 and the lower half bits PCIAD [15:0] being received by the master data buffer 213. The PCI bus 98 provides 4 byte enable signals PCIBE[3:0]$_{13}$, with bits PCIBE[3:2]_ provided to the slave data buffer 212 and bits PCIBE [1:0]_ provided to the master data buffer 213. The PCI byte enable signals PCIBE[3:0]_ and data signals PCIAD[31:0] are internally repeated in the data buffers 212 and 213 to obtain a 64-bit data width. Thus, in the slave data buffer 212, the signals IDIN[35:32] correspond to the PCI byte enable signals PCIBE[3,2,3,2]_, the signals IDIN [31:16] correspond to the PCI data bits PCIAD[31:16], and the signals IDIN[15:0] correspond also to the PCI data bits PCIAD[31:16]. In the master data buffer 213, the signals IDIN[35:0] correspond to PCI byte enable bits PCIBE[1,0,1,0]_, data bits PCIAD[15:0], and data bits PCIAD[15:0], respectively.

A second multiplexor 304 is provided to select between the parity signals associated with the processor data bus PD[63:0] and the PCI data bus PCIAD[31:0]. The processor parity signals are represented as signals PPAR[3:0] and the PCI parity signals as IPAR[3:0]. The signals PPAR[3:0] and IPAR[3:0] are provided by the P2M and I2M queues, respectively. As noted above, the 64-bit processor data bus is associated with 8 parity bits PDP[7:0], each corresponding to a byte of the processor data bus PD[63:0]. However, the PCI bus 98 includes only one parity bit PAR for all 32 data bits PCIAD[31:0]. For proper generation of parity bits in a PCI-to-memory write cycle when parity mode is enabled, the parity bits associated with each byte of the PCI data bus PCIAD[31:0] are generated inside each of the data buffers 212 and 213.

In the slave data buffer 212, parity bits are generated for PCI data bytes PCIAD[31:24] and PCIAD[23:16]. In the master data buffer 213, parity bits are generated for PCI data bytes PCIAD[15:8] and PCIAD[7:0]. Thus, the data signals IDIN[15:8] are provided to an 8-input exclusive OR gate 312, whose output is connected to both signals IPAR[3] and IPAR[1]. The data signals IDIN[7:0] are provided to the inputs of an 8-input exclusive OR gate 314, whose output is connected to both signals IPAR[2] and mPAR[0].

For a 64-bit processor data bus PD, the signals PPAR[3:0] correspond to processor parity bits PDP[3,2,7,6], respectively, in the slave data buffer 212 and to processor parity bits PDP[1,0,5,4], respectively, in the master data buffer 213. For a 32-bit processor data bus PD, the signals PPAR [3:0]correspond to parity bits PDP [3,2,3,2], respectively, in the slave data buffer 212 and to parity bits PDP[1,0,1,0], respectively, in the master data buffer 213. In the slave data buffer 212, the signals IPAR[3:0] correspond to PCI data bytes PCIAD[31:24], PCIAD[23:16], PCIAD[31:24], and PCIAD[23:16], respectively. In the master data buffer 213, the signals IPAR[3:0] correspond to PCI data bytes PCIAD [15:8], PCIAD[7:0], PCIAD[15:8], and PCIAD[7:0], respectively.

Both the multiplexors 302 and 304 are selected by a signal MEMREG0, which is provided by a D flip-flop 316. The D input of the D flip-flop 316 is connected to a memory decode signal MEMDCD[0], and its clock input is connected to a signal CLK1 provided by the clock distribution logic 222. Memory decode signals MEMDCD[1:0] are provided by the CMC 210 to indicate various memory functions. In the preferred embodiment, a processor read cycle of the memory 214 is indicated if the signals MEMDCD[1:0] contain the value 0b00, a PCI bus read cycle of the memory 214 is indicated if the value is 0b01, a processor write cycle to the memory 214 is indicated if the value is 0b10, and a PCI bus write cycle to the memory 214 is indicated if the value is 0b11. From this decode table, it can be seen that data transfer occurs between the processor and memory 214 whenever the memory decode bit MEMDCD[0] is low and a transfer is between the PCI bus and the memory if the bit MEMDCD[0] is high.

The output of the multiplexor 302 drives signals MSEL [31:0], which are provided to 4 multiplexors 30BA-D. The multiplexor 302 also provides signals MSEL[35:32] corresponding to the byte enable signals. The bytes MSEL [31:24], MSEL[23:16], MSEL[15:8] and MSEL[7:0] are provided to the 0 inputs of the multiplexors 308A-D, respectively. The 1 inputs of the multiplexors 308A-D are connected to signals ECDAT[31:24], ECDAT[23:16], ECDAT [15:8] and ECDAT[7:0], respectively. The signals ECDAT [31:0] are data signals from the memory array 214 used during a read-modify-write cycle. In ECC mode, any write on the processor data bus PD[63:0] that is less than 8 bytes or any write on the PCI data bus PCIAD[31:0] that is less than 8 bytes requires a read-modify-write cycle to be executed to the memory array 214 to obtain the bytes that are not written to. Those bytes are required for the proper generation of check bits as the error correction code algorithm is based on 64 bits of memory data. It is noted that in the preferred embodiment, use of a 32-bit microprocessor 200 will require read-modify-write cycles for all write cycles to the memory 214. The outputs of the multiplexors 308A-D provide signals RMWSEL[31:24], RMWSEL [23:16], RMWSEL[15:8] and RMWSEL[7:0], respectively.

The select inputs of the multiplexors 308A-D are connected to the outputs of AND gates 306A-D, respectively. The first inputs of the AND gates 306A-D are connected to the byte enable bits MSEL[35:32], respectively. The second inputs of the AND gates 306A-D are all connected to a signal ECCMODE, which when asserted high indicates that the error correction mode is enabled. If the signal ECCMODE is deasserted low, then parity mode is selected. A deasserted ECCMODE signal causes data to be passed directly through the 0 inputs of the multiplexors 308A-D, as no read-modify-write cycles are performed in parity mode.

The byte enable signals MSEL[35:32] are active low. Thus, in ECC mode, if a byte is not selected during a write cycle, as indicated by one of the signals MSEL[35:32] being deasserted high, then the appropriate one of the multiplexors 308A-D selects the byte of data in ECDAT[31:0] read from the memory 214 during the read portion of the read-modify-write cycle.

The output of the AND gates 306A-D are also connected to the select inputs of multiplexors 310A-D, respectively. The 0 inputs of the multiplexors 310A-D are connected to signals MSELP[3:0], respectively, provided by the multiplexor 304. These are the parity signals corresponding either to the processor data bus PD or the PCI data bus PCIAD. The 1 inputs of the multiplexors 310A-D are connected to the signals ECDATP[3:0], respectively, which are the parity or check bits retrieved from the memory array 214 during the read portion of the read-modify-write cycle. The outputs of the multiplexors 310A-D provide signals RMWSELP [3:0], respectively.

The signals RMWSEL[31:0] are connected to the input of a tristate buffer 318, whose output drives portions of the memory data bus MD. The tristate buffer 318 is enabled by a signal MDOE_, which is provided by a D flip flop 340. The D input of the D flip flop 340 is connected to the output of an inverter 342, whose input is connected to the memory decode bit MEMDCD[1]. If the bit MEMDCD[1] is high, which indicates a memory write operation, the tristate buffer 318 is enabled in each data buffer 212 or 213 to drive the appropriate portions of the memory data bus MD. The master data buffer 213 drives memory data bits MD[47:32] and MD[15:0], which correspond to signals RMWSEL [15:0] and RMWSEL[31:16], respectively, and the slave data buffer 212 drives memory data bits MD[63:48] and MD[31:16], which correspond to signals RMWSEL[15:0] and RMWSEL[31:16], respectively.

The signals RMWSEL[31:0] are also provided to check bit generators 320 and 322. The check bit generator 320 is used in the slave data buffer 212 and the check bit generator 322 is used in the master data buffer 213. The output of the check bit generator 320 provides signals ECCGENA[7:0], and the output of the check bit generator 322 provides signals ECCGENB[7:0]. The signals ECCGENA[7:4] are connected to the 0 input of a multiplexor 324, and the signals ECCGENB[3:0] are connected to the 1 input. The select input of the multiplexor 324 is connected to the signal SLAVE_, which is low in the slave data buffer 212 and high in the master data buffer 213. The output of the multiplexor 324 provides signals PEGOUT[3:0], which are partial ECC memory check bits provided to the companion data buffer for full generation of the check bits that are provided to the memory array 214.

The signals ECCGENA[3:0] are provided to the 0 input of a multiplexor 326, whose 1 input receives the signals ECCGENB[7:4]. The select input of the multiplexor 326 is also connected to the signal SLAVE_. The multiplexor 326 provides signals INTGEN[3:0].

The signals ECCGENA[7:0] and ECCGENB[7:0] are generated by check bit generators 320 and 322 according to Equations 2–17. In Equations 2–17, the symbol ⊕ indicates an exclusive-or function.

| ECCGENA[0] | = | | | |
|---|---|---|---|---|
| | (RMWSEL[0] | ⊕ RMWSEL[1] | ⊕ RMWSEL[2] | ⊕ |
| | RMWSEL[3] | ⊕ RMWSEL[8] | ⊕ RMWSEL[12] | ⊕ |
| | RMWSEL[13] | ⊕ RMWSEL[16] | ⊕ RMWSEL[17] | ⊕ (2) |
| | RMWSEL[18] | ⊕ RMWSEL[19] | ⊕ RMWSEL[241 | ⊕ |
| | RMWSEL[25] | ⊕ RMWSEL[26] | ⊕ RMWSEL[27] | ⊕ |

```
                   RMWSEL[28])
ECCGENA[1]      =
                (RMWSEL[0]      ⊕ RMWSEL[1]      ⊕ RMWSEL[2]      ⊕
                RMWSEL[3]       ⊕ RMWSEL[9]      ⊕ RMWSEL[12]     ⊕ (3)
                RMWSEL[20]      ⊕ RMWSEL[21]     ⊕ RMWSEL[22]     ⊕
                RMWSEL[23]      ⊕ RMWSEL[29])
ECCGENA[2]      =
                (RMWSEL[4]      ⊕ RMWSEL[5]      ⊕ RMWSEL[6]      ⊕
                RMWSEL[7]       ⊕ RMWSEL[10]     ⊕ RMWSEL[12]     ⊕ (4)
                RMWSEL[13]      ⊕ RMWSEL[16]     ⊕ RMWSEL[17]     ⊕
                RMWSEL[18]      ⊕ RMWSEL[19]     ⊕ RMWSEL[30])
ECCGENA[3]      =
                (RMWSEL[4]      ⊕ RMWSEL[5]      ⊕ RMWSEL[6]      ⊕
                RMWSEL[7]       ⊕ RMWSEL[11]     ⊕ RMWSEL[13]     ⊕
                RMWSEL[20]      ⊕ RMWSEL[21]     ⊕ RMWSEL[22]     ⊕ (5)
                RMWSEL[23]      ⊕ RMWSEL[24]     ⊕ RMWSEL[25]     ⊕
                RMWSEL[26]      ⊕ RMWSEL[27]     ⊕ RMWSEL[31])
ECCGENA[4]      =
                (RMWSEL[0]      ⊕ RMWSEL[4]      ⊕ RMWSEL[14]     ⊕
                RMWSEL[15]      ⊕ RMWSEL[16]     ⊕ RMWSEL[20]     ⊕ (6)
                RMWSEL[24]      ⊕ RMWSEL[28]     ⊕ RMWSEL[29]     ⊕
                RMWSEL[30]      ⊕ RMWSEL[31])
ECCGENA[5]      =
                (RMWSEL[1]      ⊕ RMWSEL[5]      ⊕ RMWSEL[81]     ⊕
                RMWSEL[9]       ⊕ RMWSEL[10]     ⊕ RMWSEL[11]     ⊕ (7)
                RMWSEL[14]      ⊕ RMWSEL[17]     ⊕ RMWSEL[21]     ⊕
                RMWSEL[25])
ECCGENA[6]      =
                (RMWSEL[2]      ⊕ RMWSEL[6]      ⊕ RMWSEL[8]      ⊕
                RMWSEL[9]       ⊕ RMWSEL[10]     ⊕ RMWSEL[11]     ⊕
                RMWSEL[14]      ⊕ RMWSEL[15]     ⊕ RMWSEL[18]     ⊕ (8)
                RMWSEL[22]      ⊕ RMWSEL[26]     ⊕ RMWSEL[28]     ⊕
                RMWSEL[29]      ⊕ RMWSEL[30]     ⊕ RMWSEL[31])
ECCGENA[7]      =
                (RMWSEL[31      ⊕ RMWSEL[7]      ⊕ RMWSEL[15]     ⊕
                RMWSEL[19]      ⊕ RMWSEL[23]     ⊕ RMWSEL[27])       (9)
ECCGENB[0]      =
                (RMWSEL[1]      ⊕ RMWSEL[4]      ⊕ RMWSEL[8]      ⊕
                RMWSEL[12]      ⊕ RMWSEL[20]     ⊕ RMWSEL[24]     ⊕ (10)
                RMWSEL[25]      ⊕ RMWSEL[26]     ⊕ RMWSEL[27]     ⊕
                RMWSEL[28])
ECCGENB[1]      =
                (RMWSEL[0]      ⊕ RMWSEL[1]      ⊕ RMWSEL[5]      ⊕
                RMWSEL[9]       ⊕ RMWSEL[13]     ⊕ RMWSEL[16]     ⊕
                RMWSEL[17]      ⊕ RMWSEL[18]     ⊕ RMWSEL[19]     ⊕ (11)
                RMWSEL[21]      ⊕ RMWSEL[24]     ⊕ RMWSEL[25]     ⊕
                RMWSEL[26]      ⊕ RMWSEL[27]     ⊕ RMWSEL[29])
ECCGENB[2]      =
                (RMWSEL[0]      ⊕ RMWSEL[10]     ⊕ RMWSEL[10]     ⊕
                RMWSEL[14]      ⊕ RMWSEL[16]     ⊕ RMWSEL[17]     ⊕
                RMWSEL[18]      ⊕ RMWSEL[19]     ⊕ RMWSEL[22]     ⊕ (12)
                RMWSEL[24]      ⊕ RMWSEL[25]     ⊕ RMWSEL[26]     ⊕
                RMWSEL[27]      ⊕ RMWSEL[30])
ECCGENB[3]      =
                (RMWSEL[0]      ⊕ RMWSEL[1]      ⊕ RMWSEL[7]      ⊕
                RMWSEL[11]      ⊕ RMWSEL[15]     ⊕ RMWSEL[23]     ⊕ (13)
                RMWSEL[24]      ⊕ RMWSEL[25]     ⊕ RMWSEL[26]     ⊕
                RMWSEL[27]      ⊕ RMWSEL[31])
ECCGENB[4]      =
                (RMWSEL[3]      ⊕ RMWSEL[4]      ⊕ RMWSEL[5]      ⊕
                RMWSEL[6]       ⊕ RMWSEL[7]      ⊕ RMWSEL[12]     ⊕
                RMWSEL[13]      ⊕ RMWSEL[14]     ⊕ RMWSEL[15]     ⊕ (14)
                RMWSEL[16]      ⊕ RMWSEL[24]     ⊕ RMWSEL[28]     ⊕
                RMWSEL[29]      ⊕ RMWSEL[30]     ⊕ RMWSEL[31])
ECCGENB[5]      =
                (RMWSEL[2]      ⊕ RMWSEL[3]      ⊕ RMWSEL[8]      ⊕
                RMWSEL[9]       ⊕ RMWSEL[10]     ⊕ RMWSEL[11]     ⊕
                RMWSEL[12]      ⊕ RMWSEL[13]     ⊕ RMWSEL[14]     ⊕ (15)
                RMWSEL[15]      ⊕ RMWSEL[17]     ⊕ RMWSEL[25]     ⊕
                RMWSEL[28]      ⊕ RMWSEL[29]     ⊕ RMWSEL[30]     ⊕
                RMWSEL[31])
ECCGENB[6]      =
                (RMWSEL[2]      ⊕ RMWSEL[18]     ⊕ RMWSEL[20]     ⊕
                RMWSEL[21]      ⊕ RMWSEL[22]     ⊕ RMWSEL[23]     ⊕ (16)
                RMWSEL[26]      ⊕ RMWSEL[28]     ⊕ RMWSEL[29]     ⊕
                RMWSEL[30]      ⊕ RMWSEL[31])
ECCGENB[7]      =
                (RMWSEL[2]      ⊕ RMWSEL[3]      ⊕ RMWSEL[4]
                RMWSEL[5]       ⊕ RMWSEL[6]      ⊕ RMWSEL[7]
                RMWSEL[8]       ⊕ RMWSEL[9]      ⊕ RMWSEL[10]
```

-continued

|  |  |  |  |
|---|---|---|---|
| RMWSEL[11] | ⊕ RMWSEL[19] | ⊕ RMWSEL[20] | (17) |
| RMWSEL[21] | ⊕ RMWSEL[22] | ⊕ RMWSEL[23] |  |
| RMWSEL[27] | ⊕ RMWSEL[28] | ⊕ RMWSEL[29] |  |
| RMWSEL[30] | ⊕ RMWSEL[31]) |  |  |

The signals INTGEN[3:0] generated by the multiplexor 326 are provided to the first inputs of 4 exclusive OR gates 328A-D, respectively. The second inputs of the exclusive OR gates 328A-D receive signals PEGIN[3:0], which are the partial ECC check bits provided by the PEGOUT[3:0] outputs of the companion data buffer.

The exclusive OR gate 328A performs an exclusive OR function of bit PEGIN[3] and bit INTGEN[3], the exclusive OR gate 328B performs an exclusive OR function of the bit PEGIN[2] and bit INTGEN[2], and so forth. The exclusive OR gates 328A-D provide output signals CEGEN[3:0], respectively, which correspond to memory check bits MDP [3,2,7,6] in the slave data buffer and check bits MDP[1,0, 5,4] in the master data buffer 213. The signals CEGEN[3:0] are provided to the 1 input of a multiplexor 330. The 0 input of the multiplexor 330 is connected to the signals RMWSELP[3:0], which correspond to memory parity bits MDP[3,2,7,6] in the slave data buffer 212 and parity bits MDP[1,0,5,4] in the master data buffer 213. The select input of the multiplexor 330 is connected to the signal ECC-MODE. The output of the multiplexor 330 is provided to a tristate buffer 332, whose output drives portions of the memory check bits MDP[7:0]. When the memory data output enable signal MDOE_ is asserted low, the slave data buffer 212 drives memory check bits MDP[3,2,7,6] and the master data buffer 213 drives memory check bits MDP[1, 0,5,4]. Thus, in ECC mode, the signals CEGEN[3:0] generated by the exclusive OR gates 328A-D in the slave and master data buffers 212 and 213 are provided as check bits MDP[7:0]. In parity mode, the processor bus parity bits PDP[7:0] are provided to check bits MDP[7:0] in a processor-to-memory write cycle, and the internally generated PCI parity bits are provided to MDP[7:0] in a PCI-to-memory write cycle.

Figure 4:
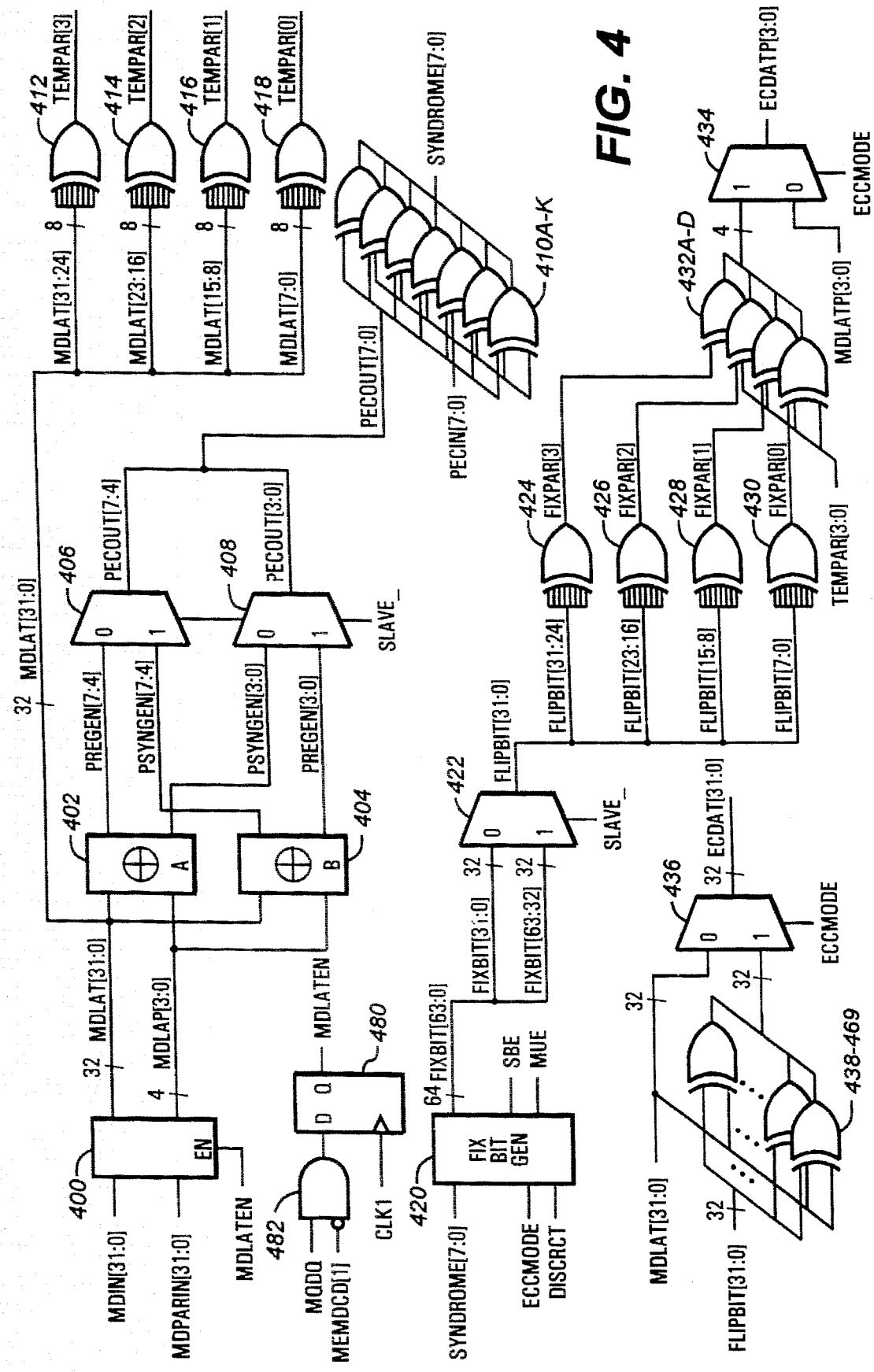
FIG. 4 is a schematic diagram of logic for detecting for single and multiple bit data errors and for correcting the data if a single bit error is detected.

Referring now to FIG. 4, a schematic diagram is shown of the error correction logic in the data buffers 212 and 213. A 36-bit latch 400 receives memory data input signals MDIN [31:0] and memory data parity input signals MDPARIN [3:0]. In the slave data buffer 212, the signals MDIN[31:0] correspond to memory data bits MD[31:16] and MD[63:48], and the signals MDPARIN[3:0] correspond to memory check bits MDP[3,2,7,6]. In the master data buffer 213, the signals MDIN[31:0] correspond to memory data bits MD[15:0] and MD[47:32], and the signals MDPARIN[3:0] correspond to memory check bits MDP[1,0,5,4]. The latch 400 is enabled by a signal MDLATEN, which is provided by a D flip flop 480. When the signal MDLATEN is asserted high, the latch 400 allows data to flow through. The D flip flop 480 is clocked by the signal CLK1, and its D input is connected to the output of an AND gate 482. The inputs of the AND gate 482 receive a signal MQDQ and the inverted state of the memory decode signal MEMDCD[1]. The signal MQDQ is provided by the CMC 210, and indicates when asserted high that valid data is driven on the memory data bus MD by the memory 214. Thus, the signal MDLATEN is asserted high when the signal MQDQ is asserted and a memory read cycle is in progress.

The latch 400 drives output signals MDLAT[31:0] and signals MDLATP[3:0]. The signals MDLAT[31:0] and MDLATP[3:0] are provided to syndrome bit generators 402 and 404. The syndrome bit generator 402 provides signals PSYNGEN[3:0] and PREGEN[7:4] and the syndrome bit generator 404 provides signals PSYNGEN[7:4] and PREGEN[3:0]. The signals PSYNGEN[7:0] and PREGEN[7:0] are generated by the syndrome bit generators 402 and 404 according to Equations 18–33.

| PSYNGEN[0] | = | | | |
|---|---|---|---|---|
| | (MDLAT[0] | ⊕ MDLAT[1] | ⊕ MDLAT[2] | ⊕ |
| | MDLAT[3] | ⊕ MDLAT[8] | ⊕ MDLAT[12] | ⊕ |
| | MDLAT[13] | ⊕ MDLAT[16] | ⊕ MDLAT[17] | ⊕ (18) |
| | MDLAT[18] | ⊕ MDLAT[19] | ⊕ MDLAT[24] | ⊕ |
| | MDLAT[25] | ⊕ MDLAT[26] | ⊕ MDLAT[27] | ⊕ |
| | MDLAT[28] | ⊕ MDLATP[0]) | | |
| PSYNGEN[1] | = | | | |
| | (MDLAT[0] | ⊕ MDLAT[1] | ⊕ MDLAT[2] | ⊕ |
| | MDLAT[3] | ⊕ MDLAT[9] | ⊕ MDLAT[12] | ⊕ (19) |
| | MDLAT[20] | ⊕ MDLAT[21] | ⊕ MDLAT[22] | ⊕ |
| | MDLAT[23] | ⊕ MDLAT[29] | ⊕ MDLATP[1]) | |
| PSYNGEN[2] | = | | | |
| | (MDLAT[4] | ⊕ MDLAT[5] | ⊕ MDLAT[6] | ⊕ |
| | MDLAT[7] | ⊕ MDLAT[10] | ⊕ MDLAT[12] | ⊕ |
| | MDLAT[13] | ⊕ MDLAT[16] | ⊕ MDLAT[17] | ⊕ (20) |
| | MDLAT[18] | ⊕ MDLAT[19] | ⊕ MDLAT[30] | ⊕ |
| | MDLATP[2]) | | | |
| PSYNGEN[3] | = | | | |
| | (MDLAT[4] | ⊕ MDLAT[5] | ⊕ MDLAT[6] | ⊕ |
| | MDLAT[7] | ⊕ MDLAT[11] | ⊕ MDLAT[13] | ⊕ |
| | MDLAT[20] | ⊕ MDLAT[21] | ⊕ MDLAT[22] | ⊕ (21) |
| | MDLAT[23] | ⊕ MDLAT[24] | ⊕ MDLAT[25] | ⊕ |
| | MDIAT[26] | ⊕ MDLAT[27] | ⊕ MDLAT[31] | ⊕ |
| | MDLATP[3]) | | | |
| PREGEN[4] | = | | | |
| | (MDLAT[0] | ⊕ MDLAT[4] | ⊕ MDLAT[14] | ⊕ |
| | MDLAT[15] | ⊕ MDLAT[16] | ⊕ MDLAT[20] | ⊕ (22) |

|  |  |  |  |  |
|---|---|---|---|---|
|  | MDLAT[24] | ⊕ MDLAT[28] | ⊕ MDLAT[29] | ⊕ |
|  | MDLAT[30] | ⊕ MDLAT[31]) |  |  |
| PREGEN[5] | = |  |  |  |
|  | (MDLAT[1] | ⊕ MDLAT[5] | ⊕ MDLAT[8] | ⊕ |
|  | MDLAT[9] | ⊕ MDLAT[10] | ⊕ MDLAT[11] | ⊕ (23) |
|  | MDLAT[14] | ⊕ MDLAT[17] | ⊕ MDLAT[21] | ⊕ |
|  | MDLAT[25]) |  |  |  |
| PREGEN[6]= |  |  |  |  |
|  | (MDLAT[2] | ⊕ MDLAT[6] | ⊕ MDLAT[8] | ⊕ |
|  | MDLAT[9] | ⊕ MDLAT[10] | ⊕ MDLAT[11] | ⊕ |
|  | MDLAT[14] | ⊕ MDLAT[15] | ⊕ MDLAT[18] | ⊕ (24) |
|  | MDLAT[22] | ⊕ MDLAT[26] | ⊕ MDLAT[28] | ⊕ |
|  | MDLAT[29] | ⊕ MDLAT[30] | ⊕ MDLAT[31]) |  |
| PREGEN[7] | = |  |  |  |
|  | (MDLAT[3] | ⊕ MDLAT[7] | ⊕ MDLAT[15] | ⊕ (25) |
|  | MDLAT[19] | ⊕ MDLAT[23] | ⊕ MDLAT[27]) |  |
| PREGEN[0] |  |  |  |  |
|  | (MDLAT[1] | ⊕ MDLAT[4] | ⊕ MDLAT[8] | ⊕ |
|  | MDLAT[12] | ⊕ MDLAT[20] | ⊕ MDLAT[24] | ⊕ (26) |
|  | MDLAT[25] | ⊕ MDLAT[26] | ⊕ MDLAT[27] | ⊕ |
|  | MDLAT[28]) |  |  |  |
| PREGEN[1]= |  |  |  |  |
|  | (MDLAT[0] | ⊕ MDLAT[1] | ⊕ MDLAT[5] | ⊕ |
|  | MDLAT[9] | ⊕ MDLAT[13] | ⊕ MDLAT[16] | ⊕ |
|  | MDLAT[17] | ⊕ MDLAT[18] | ⊕ MDLAT[19] | ⊕ (27) |
|  | MDLAT[21] | ⊕ MDLAT[24] | ⊕ MDLAT[25] | ⊕ |
|  | MDLAT[26] | ⊕ MDLAT[27] | ⊕ MDLAT[29]) |  |
| PREGEN[2] |  |  |  |  |
|  | (MDLAT[0] | ⊕ MDLAT[6] | ⊕ MDLAT[10] | ⊕ |
|  | MDLAT[14] | ⊕ MDLAT[16] | ⊕ MDLAT[17] | ⊕ |
|  | MDLAT[18] | ⊕ MDLAT[19] | ⊕ MDLAT[22] | ⊕ (28) |
|  | MDLAT[24] | ⊕ MDLAT[25] | ⊕ MDLAT[26] | ⊕ |
|  | MDLAT[27] | ⊕ MDLAT[30]) |  |  |
| PREGEN[3] | = |  |  |  |
|  | (MDLAT[0] | ⊕ MDLAT[1] | ⊕ MDLAT[7] | ⊕ |
|  | MDLAT[11] | ⊕ MDLAT[15] | ⊕ MDLAT[23] | ⊕ (29) |
|  | MDLAT[24] | ⊕ MDLAT[25] | ⊕ MDLAT[26] | ⊕ |
|  | MDLAT[27] | ⊕ MDLAT[31]) |  |  |
| PSYNGEN[4] | = |  |  |  |
|  | (MDLAT[3] | ⊕ MDLAT[4] | ⊕ MDLAT[5] | ⊕ |
|  | MDLAT[6] | ⊕ MDLAT[7] | ⊕ MDLAT[12] | ⊕ |
|  | MDLAT[13] | ⊕ MDLAT[14] | ⊕ MDLAT[15] | ⊕ (30) |
|  | MDLAT[16] | ⊕ MDLAT[24] | ⊕ MDLAT[28] | ⊕ |
|  | MDLAT[29] | ⊕ MDLAT[30] | ⊕ MDLAT[31] |  |
|  | MDLATP[0]) |  |  |  |
| PSYNGEN[5] | = |  |  |  |
|  | (MDLAT[2] | ⊕ MDLAT[3] | ⊕ MDLAT[8] | ⊕ |
|  | MDLAT[9] | ⊕ MDLAT[10] | ⊕ MDLAT[11] | ⊕ |
|  | MDLAT[12] | ⊕ MDLAT[13] | ⊕ MDLAT[14] | ⊕ (31) |
|  | MDLAT[15] | ⊕ MDLAT[17] | ⊕ MDLAT[25] | ⊕ |
|  | MDLAT[28] | ⊕ MDLAT[29] | ⊕ MDLAT[30] | ⊕ |
|  | MDLAT[31] | ⊕ MDLATP[1]) |  |  |
| PSYNGEN[6] | = |  |  |  |
|  | (MDLAT[2] | ⊕ MDLAT[18] | ⊕ MDLAT[20] | ⊕ |
|  | MDLAT[21] | ⊕ MDLAT[22] | ⊕ MDLAT[23] | ⊕ (32) |
|  | MDLAT[26] | ⊕ MDLAT[28] | ⊕ MDLAT[29] | ⊕ |
|  | MDLAT[30] | ⊕ MDLAT[31] | ⊕ MDLATP[2]) |  |
| PSYNGEN[7] | = |  |  |  |
|  | (MDLAT[2] | ⊕ MDLAT[3] | ⊕ MDLAT[4] | ⊕ |
|  | MDLAT[5] | ⊕ MDLAT[6] | ⊕ MDLAT[7] | ⊕ |
|  | MDLAT[8] | ⊕ MDLAT[9] | ⊕ MDLAT[10] | ⊕ |
|  | MDLAT[11] | ⊕ MDLAT[19] | ⊕ MDLAT[20] | ⊕ (33) |
|  | MDLAT[21] | ⊕ MDIAT[22] | ⊕ MDLAT[23] | ⊕ |
|  | MDLAT[27] | ⊕ MDLAT[28] | ⊕ MDLAT[29] | ⊕ |
|  | MDLAT[30] | ⊕ MDLAT[31] | ⊕ MDLATP[3]) |  |

From Equations 18–33, it is seen that the memory check bits MDP[7:0] are used in the generation of the signals PSYNGEN[7:0] but not in the generation of the signals PREGEN[7:0].

The signals PREGEN[7:4] are connected to the 0 input of a multiplexor 406 and the signals PSYNGEN[7:4] are connected to the 1 input of the multiplexor 406. The signals PSYNGEN[3:0] are connected to the 0 input of a multiplexor 408 and the signals PREGEN[3:0] are connected to the 1 input of the multiplexor 408. The select inputs of both the multiplexors 406 and 408 are connected to the signal SLAVE_. The output of the multiplexor 406 provides signals PECOUT[7:4] and the output of the multiplexor 408 provides to signals PECOUT[3:0]. The partial syndrome bits PECOUT[7:0] are provided to the first inputs of 8 exclusive OR gates 410A-K, respectively. The signals PECOUT[7:0] are also provided to the companion data buffer for the full generation of the syndrome bits. The second inputs of the exclusive OR gates 410A-K provide signals PECIN[7:0], respectively, which are the partial syndrome bits PECOUT [7:0] provided by the companion data buffer. The exclusive OR gate 410A performs an exclusive OR function of the signals PECOUT[7] and PECIN[7], the exclusive OR gate 410B performs an exclusive OR function of the signals PECOUT[6] AND PECIN[6], and so forth. The outputs of the exclusive OR gates 410A-K provide syndrome bits SYNDROME[7:0], respectively.

The signals MDLAT[31:0] provided by the latch 400 are also connected to the inputs of four 8-input exclusive OR gates 412, 414, 416 and 418. The byte MDLAT[31:24] is provided to the exclusive OR gate 412, the byte MDLAT [23:16] is provided at the exclusive OR gate 414, the byte MDLAT[15:8] is provided the exclusive OR gate 416, and the byte MDLAT[7:0] is provided to the exclusive OR gate 418. The exclusive OR gates 412, 414, 416 and 418 generate temporary parity bits TEMPAR[3:0], respectively.

The syndrome bits SYNDROME[7:0] are received by a fix bit generator 420, which is enabled by the signal ECCMODE. Another signal DISCRCT is provided to an input of the fix bit generator 420. The signal DISCRCT is asserted high by setting bits 4 and 20 of the control register 230. If the signal DISCRCT is set high, then the single bit error correction capability of the data buffers 212 and 213 is disabled. The output signals provided by the fix bit generator 420 are signals FIXBIT[63:0], SBE and MUE. If the signal SBE is asserted high, that indicates a single bit correctable error has occurred. If the signal MUE is asserted high, then a multiple bit error has been detected that is not correctable. The bits FIXBIT[63:0] are used to invert the erroneous memory data bit when a single bit error occurs. If the signal ECCMODE is deasserted low, indicating that parity mode is selected, then the signals FIXBIT[63:0], SBE and MUE are all driven low by the fix bit generator 420. If the disable signal DISCRCT is asserted high, then the signals FIXBIT [63:0] are driven to the value 0 in all cases. However, the signals SBE and MUE remain enabled when the signal DISCRCT is asserted high. If the signal ECCMODE is asserted high and the signal DISCRCT is deasserted low, then the output signals FIXBIT[63:0], SBE and MUE are generated according to Table 1, as shown in FIGS. 8A–8C. Table 1 includes four columns, in which the first column lists values of the syndrome bits SYNDROME[7:0] associated with a single bit error, column 2 lists the corresponding values of FIXBIT[63:0], column 3 shows the memory data or parity bit that is erroneous, and column 4 shows in which data buffer 212 or 213 the data error occurred. For values of the syndrome bits SYNDROME[7:0] other than those listed in column 1, the signal SBE is deasserted low and the signal MUE is asserted high to indicate a multiple bit error, which is not correctable by the error correction logic.

The signals FIXBIT[63:0] are divided up into an upper and lower half, with the lower half provided to the 0 input of a multiplexor 422 and the upper half provided to the 1 input of the multiplexor 422. The select input of the multiplexor 422 is connected to the signal SLAVE_. Thus, the signals FIXBIT[31:0] are used in the slave data buffer 212 and the signals FIXBIT[63:32] are used in the master data buffer 213. The output of the multiplexor 422 provides signals FLIPBIT[31:0]. From Table 1, it is seen that single bit errors in the check bits MDP[7:0] are not corrected. The check bits MDP[7:0] are used exclusively to determine if a single-bit correctable error has occurred in ECC mode. The check bits MDP[7:0] are not forwarded to the processor bus 202 or PCI bus 98, and thus need not be corrected.

Bytes FLIPBIT[31:24], FLIPBIT[23:16], FLIPBIT[15:8] and FLIPBIT[7:0] are provided to four 8input exclusive OR gates 424, 426, 428 and 430, respectively. The exclusive OR gates 424, 426, 428, and 430 provide signals FIXPAR[3:0], respectively, to the first inputs of four exclusive OR gates 432A-D. The second inputs of the exclusive OR gates 432A-D receive the temporary parity bits TEMPAR[3:0], respectively. Thus, the signals FIXPAR[3] and TEMPAR[3] are provided to the exclusive OR gate 432A, the signals FIXPAR[2] and TEMPAR[2] are provided to the exclusive OR gate 432B, and so forth. The outputs of the exclusive OR gates 432A-D are connected to the 1 input of a multiplexor 434. The 0 input of the multiplexor 434 receives the signals MDLATP[3:0] provided by the input latch 400, and the select input of the multiplexor 434 is connected to the signal ECCMODE. The output of the multiplexor 434 drives the signals ECDATP[3:0].

The parity signals must be updated for the corrected memory read data before they are transmitted to the processor bus 202, if ECC mode is selected. The signals FIXPAR[3:0] indicate if a particular byte of the memory data MD has been corrected, and are compared with the temporary parity bits TEMPAR[3:0] generated for the original memory read data. The exclusive OR gates 432A-D flip the parity bit associated with the byte containing the erroneous data bit. In parity mode, however, the memory 214 parity bits MDP[7:0] are directly transmitted via the signals ECDATP[3:0] to the processor bus 202.

The signals MDLAT[31:0] are also provided to the 0 input of a multiplexor 436, whose 1 input is connected to the outputs of 32 two-input exclusive OR gates 438–469. The first inputs of the exclusive OR gates 438–469 receive the signals MDLAT[31:0], respectively, and the second inputs receive the signals FLIPBIT[31:0], respectively. Thus, the exclusive OR gate 438 receives the signals MDLAT[31] and FLIPBIT[31], the exclusive OR gate 439 receives the signals MDLAT[30] and FLIPBIT[30], and so forth. The exclusive OR gates 438–469 perform the actual error correction of the memory data signals presented on MDLAT[31:0]. Since the signals FLIPBIT[31:0] indicate which data bit is erroneous, the exclusive OR function performed by exclusive OR gates 438–469 flips the erroneous data bit in signals MDLAT [31:0]. The multiplexor 436 is selected by the signal ECCMODE and provides the signals ECDAT[31:0]. Thus, in parity mode, the memory data inputs MDLAT[31:0] are passed directly to the signals ECDAT[31:0] without error correction. However, in ECC mode, the data bits MDLAT [31:0] are first corrected, if a single bit error has occurred, before being provided to the signals ECDAT[31:0].

Figure 5:
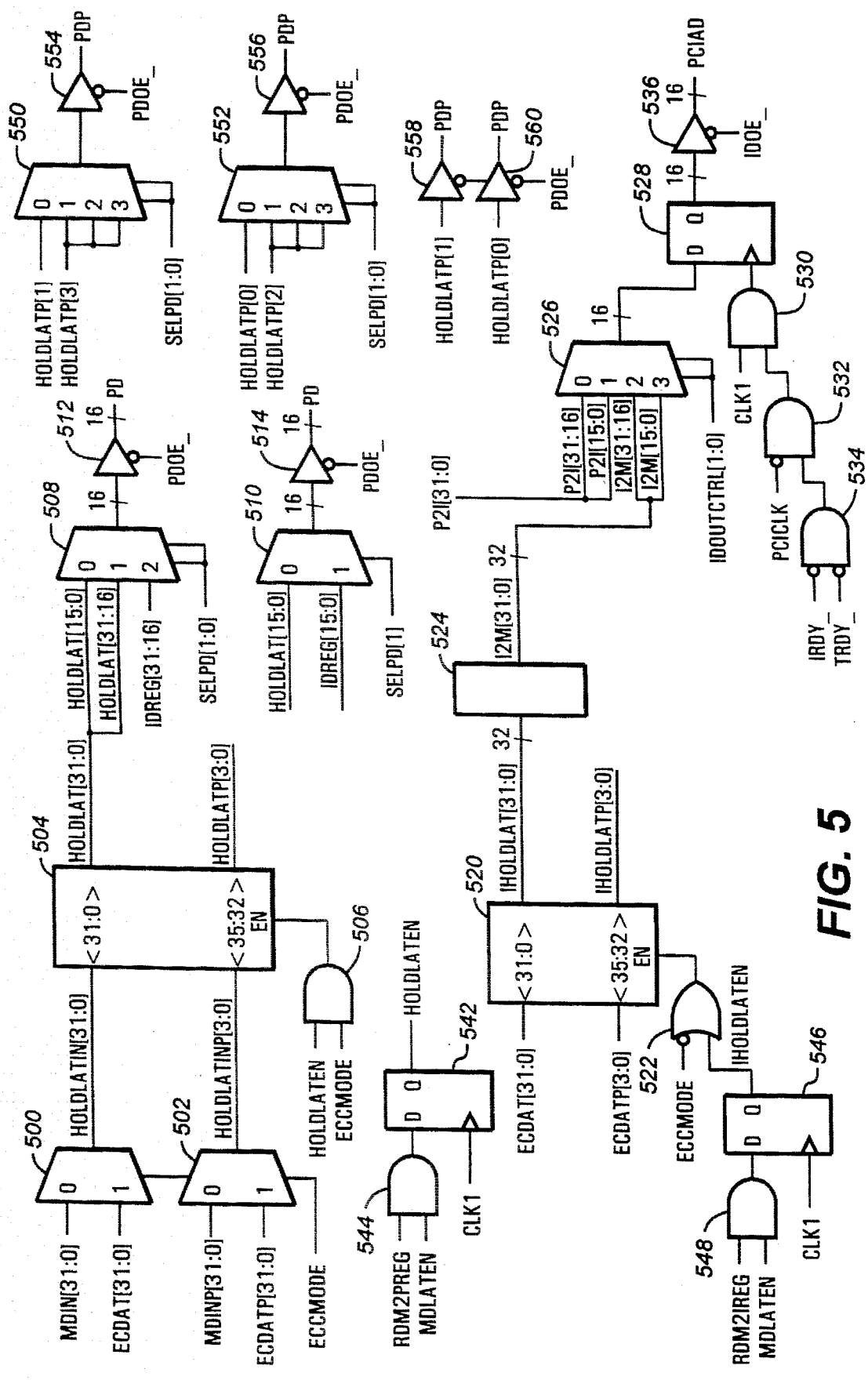
FIG. 5 is a schematic diagram of logic for routing data from the memory to various buses in the computer system.

Referring now to FIG. 5, portions of the data path from the memory data bus MD[63:0] to the processor data bus PD[63:0] and the PCI data bus PCIAD[31:0] are shown. The memory data inputs MDIN[31:0] are connected to the 0 input of a multiplexor 500. The 1 input of the multiplexor 500 receives the signals ECDAT[31:0]. The memory data parity bits MDINP[3:0] are connected to the 0 input of a multiplexor 502 and its 1 input receives the signals ECDATP [3:0]. The select inputs of both multiplexors 500 and 502 are connected to the signal ECCMODE. Thus, in parity mode, the memory data and parity inputs MDIN[31:0] and MDINP [3:0] are selected. In ECC mode, the corrected data and parity bits ECDAT[31:0] and ECDATP[3:0] are selected.

The outputs of the multiplexors 500 and 502 provide signals HOLDLATIN[31:0] and HOLDLATINP[3:0], respectively, which are provided to the inputs of a 36-bit latch 504. The latch 504 is enabled by the output of an AND gate 506, whose inputs receive signals HOLDLATEN and ECCMODE. The signal HOLDLATEN is provided by a D flip flop 542, which is clocked by the signal CLK1. The D input of the D flip flop 542 is connected to the output of an AND gate 544, whose inputs receive signals RDM2PREG and MDLATEN. The signal RDM2REG is asserted high when the memory decode signals MEMDCD[i:0] contain the value zero, indicating a processor-to-memory read cycle. Thus, during a processor-to-memory read cycle in ECC mode, the latch 504 allows data to pass through.

The 36-bit latch 504 provides signals HOLDLAT[31:0] and HOLDLATP[3:0]. The signals HOLDLAT[31:0] are provided to the inputs of multiplexors 508 and 510, and the signals HOLDLATP[3:0] are provided to the inputs of multiplexors 550 and 552 and tristate buffers 558 and 560. The signals HOLDLAT[15:0], HOLDLAT[31:16] and IDREG[31:16] are provided to the 0, 1 and 2 inputs of the multiplexor 508, respectively. The select inputs of the multiplexor 508 are connected to signals SELPD[1:0]. The output of the multiplexor 508 is connected to the input of a tristate buffer 512. The tristate buffer 512 drives portions of the processor data bus PD[63:0], and is enabled when a signal PDOE_ is asserted low. For a 64-bit processor data bus PD, the tristate buffer 512 in the slave data buffer 212 drives the processor data bits PD[31:16], and the tristate buffer 512 in the master data buffer 213 drives bits PD[15:0]. For a 32-bit processor data bus PD, the tristate buffer 512 drives processor data bits PD[31:16] in the slave data buffer 212, and drives data bits PD[15:0] in the master data buffer 213.

The 0 input of the multiplexor 508 is selected, that is, signals SELPD[1:0] are equal to 0b00, when CPU decode bits CPUDCD[2:0] contain the value 0b010 and the microprocessor 200 is a 32-bit processor. The decode bits CPUDCD[2:0] are provided by the CMC 210 to indicate different processor cycles. A value of 0b010 indicates a processor-to-memory read cycle of the upper half of the 64-bit memory data MD. As a result, the signals HOLDLAT [15:0], which correspond to memory data bits MD[63:48] in the slave data buffer 212 and data bits MD[47:32] in the master data buffer 213, are selected.

For a 64-bit memory-to-processor read or a 32-bit memory-to-processor read of the lower half of the memory data MD, that is, signals CPUDCD[2:0] are equal 0b001, the value of SELPD[1:0] is set to 0b01 to select the 1 input of the multiplexor 508. In this case, the state of signals HOLDLAT[31:16], which correspond to memory data bits MD[31:16] in the slave data buffer and data bits MD[15:0] in the master data buffer 213, are provided to the processor data bus PD.

For a PCI-to-processor read transfer, the value of CPUDCD[2:0] is equal to 0b011, in which case the value of the signals SELPD[1:0] is set equal to 0b10. As a result, the signals IDREG[31:16] are provided and provided to the input of the tristate buffer 512. The signals IDREG[31:16] are provided by a register (not shown) storing data received from the PCI data bus PCIAD[31:16] in the slave data buffer 212 and PCIAD[15:0] in the master data buffer 213.

The signals HOLDLAT[15:0] are also provided to the 0 input of the multiplexor 510, whose 1 input receives PCI data signals IDREG[15:0]. The signals IDREG[15:0], which are identical to signals IDREG[31:16], correspond also to the PCI data bits PCIAD[31:16] in the slave data buffer 212 and PCIAD[15:0] in the master data buffer 213. The select input of the multiplexor 510 is connected to the signal SELPD[1], which is asserted high during a PCI-to-processor read transfer. Thus, if the signal SELPD[1] is asserted high, the slave data buffer 212 provides the PCI data bits PCIAD [31:16] to the processor data bus PD[31:16] through the multiplexor 508 and the master data buffer 213 provides PCI data bits PCIAD[15:0] to the processor data bus PD[15:0] through the multiplexor 510. If the signal SELPD[1] is deasserted low, then the signals HOLDLAT[15:0] are provided by the multiplexor 510. The signals HOLDLAT[15:0] correspond to memory data bits MD[63:48] in the slave data buffer 212 and bits MD[47:32] in the master data buffer 213. The output of the multiplexor 510 is connected to the input a tristate buffer 514. The tristate buffer 514 is enabled whenever the signal PDOE_ is asserted low. For a 64-bit processor data bus PD, the tristate buffer 514 in the slave data buffer 212 drives the processor data bits PD[63:48], and in the master data buffer 213 drives data bits PD[47:32]. When a 32-bit microprocessor 200 is used, however, the output of the tristate buffer 514 is left unconnected.

The signal HOLDLATP[1] is provided to the 0 input of the multiplexor 550, and the signal HOLDLATP[3] is provided to the 1, 2 and 3 inputs of the multiplexor 550. The signal HOLDLATP[0] is provided to the 0 input of the multiplexor 552, and the signal HOLDLATP[2] is provided to its 1, 2 and 3 inputs. The select inputs of the multiplexors 550 and 552 are connected to the signals SELPD[1:0]. The outputs of the multiplexors 550 and 552 are connected to the inputs of tristate buffers 554 and 556, respectively. The tristate buffers 554 and 556 are enabled by the signal PDOE and drive certain bits of the parity bits PDP. For a 64-bit processor data bus PD, the tristate buffer 554 drives bit PDP[3] in the slave data buffer 212 and bit PDP[1] in the master data buffer 213. The tristate buffer 556 drives bit PDP[2] in the slave data buffer 212 and bit PDP[0] in the master data buffer 213. For a 32-bit processor data bus PD, the tristate buffer 554 drives bit PDP[3] in the slave data buffer 212 and bit PDP[1] in the master data buffer 212. The tristate buffer 556 drives bit PDP[2] in the slave data buffer 212 and bit PDP[0] in the master data buffer 213.

Thus, for a 32-bit memory-to-processor read cycle of the upper half of the memory data bus MD, the 0 inputs of the multiplexors are selected. This routes parity bits corresponding to bytes MD[63:56] and MD[55:48] to processor parity bits PDP[3,2] through the slave data buffer 212 and parity bits corresponding to bytes MD[47:40] and MD[39:32] to processor parity bits PDP[1,0] through the master data buffer 213. For a 32-bit read to the lower half of the memory data MD or for a 64-bit read, parity bits corresponding to bytes MD[31:24] and MD[23:16] are routed to processor parity bits PDP[3,2] by the slave data buffer 212 and parity bits corresponding to bytes MD[15:8] and MD[7:0] are routed to PDP[1:0] by the master data buffer 213.

The signals HOLDLATP[1,0] are also provided to the inputs of tristate buffers 558 and 560, respectively, which are enabled by the signal PDOE_. For a 64-bit processor data bus PD, the tristate buffers 558 and 560 drive parity bits PDP[7,6] in the slave data buffer 212 and parity bits PDP [5,4] in the master data buffer 213. For a 32-bit processor data bus PD, the outputs of the tristate buffers 558 and 560 are left unconnected.

In the data path from the memory data bus MD to the PCI data bus PCIAD, a 36-bit latch 520 receives the signals ECDAT[31:0] and ECDATP[3:0]. The enable input of the latch 520 is connected to the output of an OR gate 522, whose inputs receive a signal IHOLDLATEN and the inverted state of the signal ECCMODE. In parity mode, the latch 520 is transparent. The signal IHOLDLATEN is provided by a D flip flop 546, which is clocked by the signal CLK1. The D input of the D flip flop 546 is connected to the output of an AND gate 548, which receives signals RDM2IREG and MDLATEN. The signal RDM2IREG is asserted high when the value of signals MEMDCD[1:0] is equal 0b01, indicating a memory-to-PCI read cycle.

As noted above, the signals ECDAT[31:0] represent the data corrected by the ECC logic when in ECC mode. The signals ECDATP[3:0] represent the updated parity bits for the corrected data bits ECDAT[31:0]. In parity mode, however, the error correction logic is bypassed and the signals ECDAT[31:0] come directly from the memory data bus MD and the signals ECDATP[3:0] come directly from the memory parity signals MDP[7:0]. The output of the 36-bit latch 520 drives signals IHOLDLAT[31:0] and IHOLDLATP[3:0]. Since the PCI data bus PCIAD is associated with only one parity bit PAR, the parity bits IHOLDLATP[3:0] generated in the data buffers 212 and 213 are ignored. Instead, the parity bit PAR is generated by the CMC 210, with the state of PAR set to achieve even parity on the PCI data bus PCIAD.

The signals IHOLDLAT[31:0] are provided to an I2M queue block 524, which performs various multiplexing and queuing functions. For clarity, the block 524 is not described in detail. In the preferred embodiment, transfers between the memory array 214 and the PCI bus 98 are queued to allow for better performance. The output of the block 524 drives signals I2M[31:0]. The signals I2M[31:16] are provided to the 2 input of a 4:1 multiplexor 526 and the signals I2M[15:0] are provided to its 3 input. The 0 input of the multiplexor 526 receives to signals P2I[31:16] and the 1 input receives signals P2I[15:0]. The signals P2I[31:0] represent data signals coming from the processor-to-PCI queue. Thus, the multiplexor 526 selects 16 bits of either the processor data PD or the memory data MD to be provided to the PCI data bus PCIAD.

The select inputs of the multiplexor 526 are connected to signals IDOUTCTRL[1:0]. The 16-bit output of the multiplexor 526 drives the data input of a 16bit register 528, whose clock input is connected to the output of an AND gate 530. The first input of the AND gate 530 is connected to the signal CLK1. The second input of the AND gate 530 is connected to the output of an AND gate 532, whose inputs are connected to the inverted state of a signal PCICLK and the output of a NOR gate 534. The signal PCICLK is the PCI bus clock, which preferably runs at a frequency of 25 or 33 MHz. The inputs of the NOR gate 534 receive PCI signals IRDY_ and TRDY_. The signal IRDY_ when asserted low indicates that the requesting bus master on the PCI bus 98 is ready to complete the current data phase of the transaction. The signal TRDY when asserted low indicates that the target or slave device on the PCI bus 98 is able to complete the current data phase of the transaction. Thus, the state of the register 528 is not changed until the CMC 210 has asserted the signal TRDY_ and the PCI bus master which requested the read from the memory array 214 maintains the signal IRDY_ asserted low.

The output of the register 528 is connected to the input of a tristate buffer 536, which is enabled by a signal IDOE_. The signal IDOE_ is asserted low whenever the data buffers 212 and 214 are ready to drive data onto the PCI data bus PCIAD[31:0] during the data phase of the PCI transaction. Data bits PCIAD[31:16] are provided by the slave data buffer 212 and bits PCIAD[15:0] are provided by the master data buffer 213.

In a memory-to-PCI transfer, the 64 bits of memory data MD[63:0] are provided to the PCI data bus PCIAD[31:0] 32 bits at a time. For a memory-to-PCI transfer, the signal IDOUTCTRL[1] is asserted high and the signal IDOUTCTRL[0] is equal to a signal SELIDODD, which is provided by the CMC 210. The CMC 210 toggles the state of the signal SELIDODD to control the transfer of data from the 64-bit memory data bus MD to the 32-bit PCI data bus PCIAD. For a processor-to-PCI transfer the signal IDOUTCTRL[1] is equal to 0. For the processor-to-PCI transfer involving a 64-bit processor data bus PD, the signal IDOUTCTRL[0] is similarly controlled by the state of the signal SELIDODD for proper multiplexing of the 64-bit processor data bus PD to the PCI data bus PCIAD.

Figure 6:
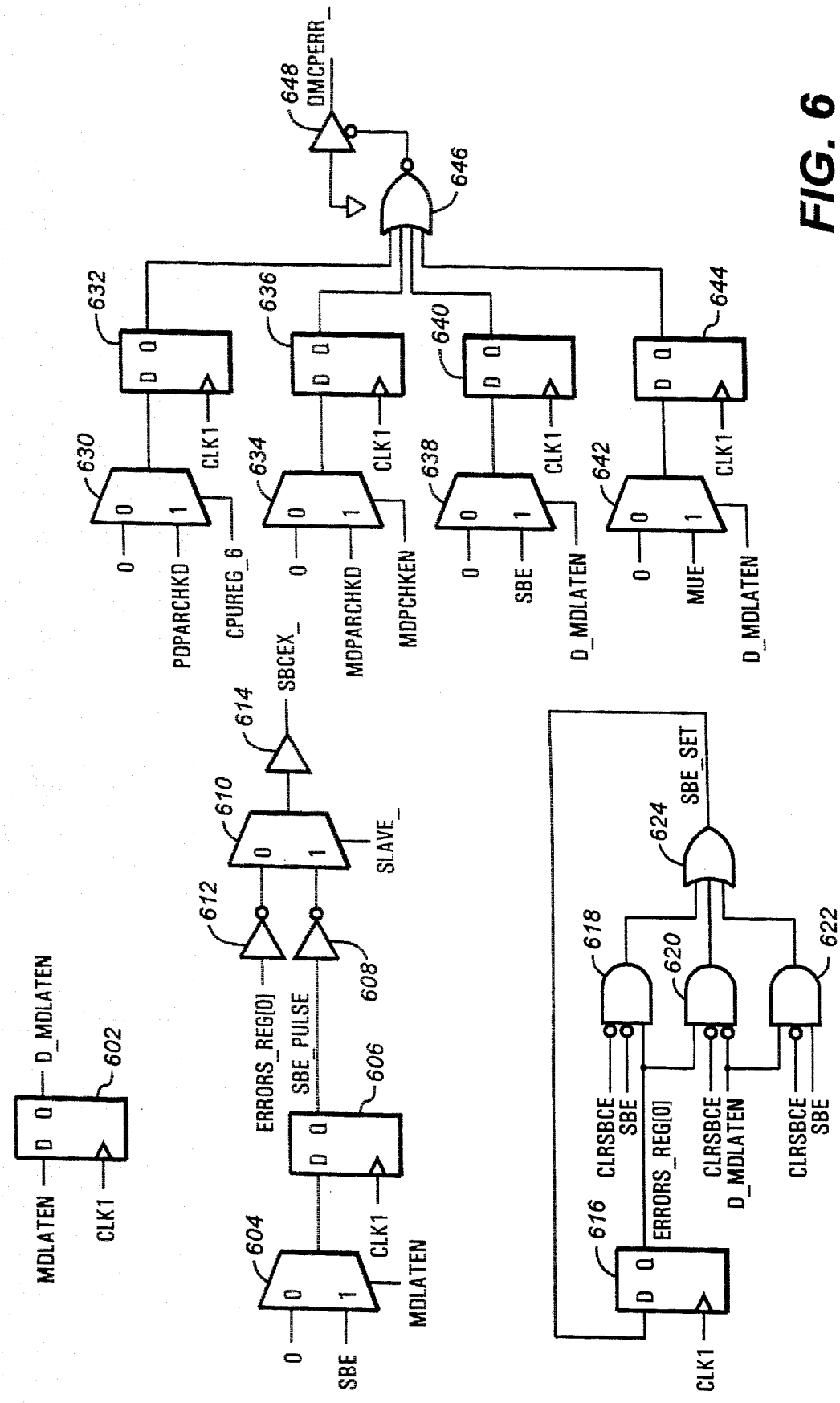
FIG. 6 is a schematic diagram of logic for generating signals indicative of a data error.

Referring now to FIG. 6, a schematic diagram is shown of logic that generates signals notifying the CMC 210 of a data error condition. The signal MDLATEN, which is asserted high during a memory-to-processor or a memory-to-PCI data transfer, is connected to the D input of a D flip flop 602, which is clocked by the signal CLK1. The D flip flop 602 provides a signal D_MDLATEN, which is effectively a delayed version of the input MDLATEN. The signal SBE, which is generated by the fix bit generator 420 to indicate the occurrence of a single bit correctable error, is connected to the 1 input of a multiplexor 604, whose 0 input is tied low. The multiplexor 604 is selected by the signal MDLATEN, and its output is connected to the D input of a D flip flop 606. The D flip flop 606 is clocked by the signal CLK1, and its output drives a signal SBE_PULSE. During a memory read cycle, the state of the signal SBE_PULSE follows the signal SBE. Otherwise, the signal SBE_PULSE is driven low. The signal SBE_PULSE is connected to the input of an inverter 608, whose output is connected to the 1 input of a multiplexor 610. The 0 input of the multiplexor 610 is connected to the output of an inverter 612, whose input is connected to a signal ERRORS REG_REG[0]. The output of the multiplexor 610 is provided to the input of a buffer 614, which drives a signal SBCEX_, where X is equal to 0 for the slave data buffer 212 and 1 for the master data buffer 213. The signal SBCE0_ is provided to the CMC 210 by the slave data buffer 212 to indicate when a single bit correctable error has occurred. The signal SBCE1_ is provided by the master data buffer 213 via processor connectors 224 and 114 to the miscellaneous logic chip 132. As noted above, the miscellaneous logic chip 132 includes the hardware interrupt controller. In response to the assertion of the signal SBCE1_, internal logic in the miscellaneous logic chip 132 provides an interrupt request signal IRQ13 to the interrupt controller. In response to the interrupt signal IRQ13, the interrupt controller asserts a hardware interrupt INTR to the microprocessor 200 through connectors 114 and 224. In response to the assertion of the signal INTR, the microprocessor 200 generates an interrupt acknowledge cycle. The PCI-EISA bridge 130 picks up the interrupt acknowledge cycle and asserts a signal INTA* to the interrupt controller in the miscellaneous logic chip 132. In response to the assertion of the signal INTA*, the interrupt controller provides the IRQ13 interrupt vector to the EISA data bus SD. The PCI-EISA bridge 130 passes the interrupt vector to the microprocessor 200, which then executes the interrupt service routine corresponding to IRQ13. The interrupt service routine sets bits 0 and 16 of the control register 230 in the data buffers 212 and 213, which deassert the signals SBCE0_ and SBCE1_.

The signal ERRORS_REG[0] is provided by a D flip flop 616, whose D input is connected to a signal SBE_SET and which is clocked by the signal CLK1. The signal ERRORS_REG[0] is also connected to one input of an AND gate 618 and one input of an AND gate 620. The other inputs of the AND gate 618 receive the inverted state of a signal CLRSBCE and the inverted state of the signal SBE. The signal CLRSBCE is set high in data buffers 212 and 213 when bits 0 and 16, respectively, of the control register 230 are set. The other inputs of the AND gate 620 receive the inverted state of the signal CLRSBCE and the inverted state of the signal D_MDLATEN.

The signal D_MDLATEN is also connected to one input of an AND gate 622. The other inputs of the AND gate 622 receive the signal SBE and the inverted state of the signal CLRSBCE. The outputs of the AND gates 618, 620 and 622 are provided to the inputs of an OR gate 624, whose output drives the signal SBE_SET. If the signal CLRSBCE is deasserted low, then the signal SBE_SET is asserted high if the signal SBE is asserted high by the fix bit generator 420 during a memory read cycle. The state of the signal SBE_SET is latched by the D flip flop 616. The signal SBE_SET is maintained high by AND gates 618 and 620 until the signal CLRSBCE is asserted high. Thus, it can be seen that in the master data buffer 213, the signal SBCE1_ is pulsed low when a single bit error occurs. The duration of the pulse of the signal SBCE1_ is the amount of time required for the erroneous data bit to be corrected. When that occurs, the signal SBE is deasserted low, which causes the signal SBCE1_ to be brought back high. In the slave data buffer 212, however, the signal SBCE0_ is maintained low until the interrupt service routine corresponding to interrupt level IRQ13 sets bits 0 and 16 in the control register 230.

To indicate that a data error has occurred, a signal DMCPERR_ is asserted by the data buffer 212 or 213 and provided to the CMC 210. The following describes the logic used to generate the signal DMCPERR_. A signal PDPARCHKD is provided to the 1 input of a multiplexor 630, whose 0 input is tied low. The multiplexor 630 is selected by a signal CPUREG 6, which is asserted high when the value of the signals CPUDCD[2:0] is equal to 6, indicating a burst writeback cycle to the memory 214. The signal PDPARCHKD is asserted high if a parity error occurs on the processor bus PD. To determine if a parity error has occurred, the function defined by Equation 34 is performed.

A signal MDPARCHKD, which indicates a parity error on the memory data bus MD, is provided to the 1 input of a multiplexor 634, whose 0 input is tied low. The multiplexor 634 is selected by a signal MDPCHKEN, which is asserted high if the signal MQDQ is asserted high and the signal MEMDCD [1] is deasserted low indicating a memory read cycle from either the processor bus 202 or the PCI bus 98. The signal MDPARCHKD is defined by Equation 35.

$$
\begin{aligned}
\text{PDPARCHKD} = \{ &\text{PDIN}[3] \oplus \text{PDIN}[30] \oplus \text{PDIN}[29] \oplus \\
&\text{PDIN}[28] \oplus \text{PDIN}[27] \oplus \text{PDIN}[26] \oplus \\
&\text{PDIN}[25] \oplus \text{PDIN}[24] \oplus \text{PPAR}[3] \} + \\
\{ &\text{PDIN}[23] \oplus \text{PDIN}[22] \oplus \text{PDIN}[21] \oplus \\
&\text{PDIN}[20] \oplus \text{PDIN}[19] \oplus \text{PDIN}[18] \oplus \\
&\text{PDIN}[17] \oplus \text{PDIN}[16] \oplus \text{PPAR}[2] \} + \\
\{ &\text{PDIN}[15] \oplus \text{PDIN}[14] \oplus \text{PDIN}[13] \oplus \\
&\text{PDIN}[12] \oplus \text{PDIN}[11] \oplus \text{PDIN}[10] \oplus \\
&\text{PDIN}[9] \oplus \text{PDIN}[8] \oplus \text{PPAR}[1] \} + \\
\{ &\text{PDIN}[7] \oplus \text{PDIN}[6] \oplus \text{PDIN}[5] \oplus \\
&\text{PDIN}[4] \oplus \text{PDIN}[3] \oplus \text{PDIN}[2] \oplus \\
&\text{PDIN}[1] \oplus \text{PDIN}[0] \oplus \text{PPAR}[0] \}
\end{aligned}
\qquad (34)
$$

The output of the multiplexor 630 is provided to the D input of a D flip flop 632, which is clocked by the signal CLK1.

$$
\begin{aligned}
\text{MDPARCHKD} = \ & \{\text{MDLAT}[31] \oplus \text{MDLAT}[30] \oplus \text{MDLAT}[29] \oplus \\
& \text{MDLAT}[28] \oplus \text{MDLAT}[27] \oplus \text{MDLAT}[26] \oplus \\
& \text{MDLAT}[25] \oplus \text{MDLAT}[24] \oplus \text{MDLATP}[3]\} \ \& \\
& !\text{ECCMODE} + \\
& \{\text{MDLAT}[23] \oplus \text{MDLAT}[22] \oplus \text{MDLAT}[21] \oplus \\
& \text{MDLAT}[20] \oplus \text{MDLAT}[19] \oplus \text{MDLAT}[18] \oplus \\
& \text{MDLAT}[17] \oplus \text{MDLAT}[16] \oplus \text{MDLATP}[2]\} \ \& \\
& !\text{ECCMODE} + \\
& \{\text{MDLAT}[15] \oplus \text{MDLAT}[14] \oplus \text{MDLAT}[13] \oplus \\
& \text{MDLAT}[12] \oplus \text{MDLAT}[11] \oplus \text{MDLAT}[10] \oplus \\
& \text{MDLAT}[9] \oplus \text{MDLAT}[8] \oplus \text{MDLATP}[1]\} \ \& \\
& !\text{ECCMODE} + \\
& \{\text{MDLAT}[7] \oplus \text{MDLAT}[6] \oplus \text{MDLAT}[5] \oplus \\
& \text{MDLAT}[4] \oplus \text{MDLAT}[3] \oplus \text{MDLAT}[2] \oplus \\
& \text{MDLAT}[1] \oplus \text{MDLAT}[0] \oplus \text{MDLATP}[0]\} \ \& \\
& !\text{ECCMODE}
\end{aligned}
\quad (35)
$$

As is seen from Equation 35, parity checking of the memory data bus MD is performed only if the data buffers 212 and 213 are in parity mode. The output of the multiplexor 634 is provided to the D input of a D flip flop 636, which is clocked by the signal CLK1.

The signal SBE provided by the fix bit generator is connected to the 1 input of a multiplexor 638, whose 0 input is tied low. The multiplexor 638 is selected by the signal D_MDLATEN and its output is connected to the D input of a D flip flop 640, which is clocked by the signal CLK1. The signal MUE indicating a multiple bit error provided by the fix bit generator is connected to the 1 input of a multiplexor 642, whose 0 input is tied low. The multiplexor 642 is also selected by the signal D_MDLATEN, and its output is connected to the D input of a D flip flop 644. The D flip flop 644 is clocked by the signal CLK1.

The outputs of the D flip flops 632, 636, 640 and 644 are connected to the inputs of a 4-input NOR gate 646, whose output is connected to the enable input of a tristate buffer 648. The input of the tristate buffer is tied to ground, and its output drives the signal DMCPERR_, which is connected to the CMC 210 to indicate when a data error has occurred. The tristate buffer 648 is enabled when the output of the NOR gate 646 is low. Thus, if a parity error occurs on the processor data bus PD during a processor-to-memory write cycle, if a parity error occurs on the memory data bus MD during a read of the memory array 214 in parity mode, or if a single bit or multiple bit error is detected in ECC mode, the signal DMCPERR_ is asserted low by one of the data buffers 212 and 213.

Figure 7:
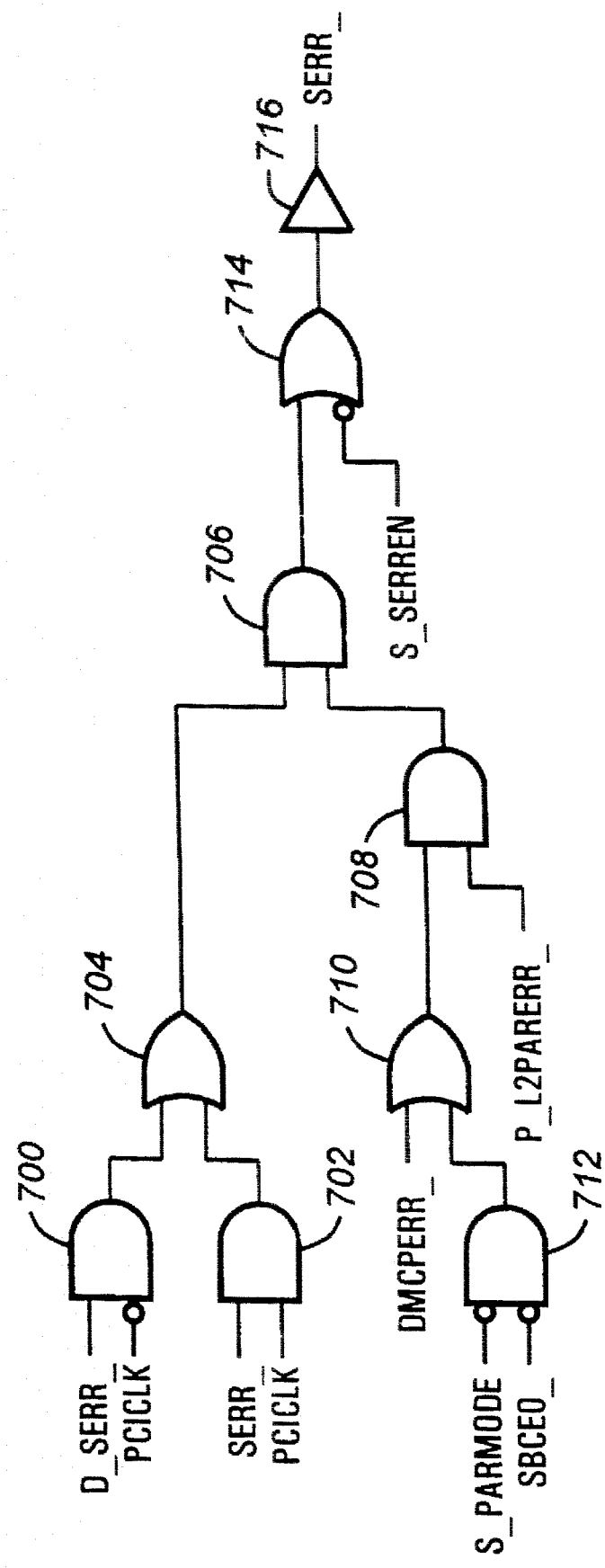
FIG. 7 is a schematic diagram of logic responsive to the signals FIG. 6 for generating a system error signal.

As discussed earlier, the signals SBCE0_ and DMCPERR_ are provided to the CMC 210. Referring now to FIG. 7, logic in the CMC 210 that responds to the signals SBCE0_ and DMCPERR_ is shown. In the CMC 210, a signal D SERR is connected to one input of an AND gate 700, whose other input is connected to the inverted state of the PCI bus clock PCICLK. The signal D_SERR_ is asserted low whenever a parity error occurs on the PCI data bus PCIAD. A system error signal SERR is connected to one input of an AND gate 702 and the other input is connected to the clock signal PCICLK. The outputs of the AND gates 700 and 702 are connected to the inputs of an OR gate 704, whose output is connected to one input of an AND gate 706. The other input of the AND gate 706 is connected to the output of an AND gate 708. The first input of the AND gate 708 receives a signal P_L2PARERR_, which is asserted low when a parity error occurs during a read of the L2 cache memory 208. The second input of the AND gate 708 is connected to the output of an OR gate 710, whose first input receives the signal DMCPERR_ and whose second input is connected to the output of a NOR gate 712. The inputs of the NOR gate 712 receive a signal S_PARMODE and the signal SBCE0_. The signal S_PARMODE is set low for ECC mode and set high for parity mode. Thus, in parity mode, the signal SBCE0_ is ignored.

The output of the AND gate 706 is provided to the first input of an OR gate 714, whose other input is connected to the inverted state of a signal S_SERREN. The signal S_SERREN is set low to disable the assertion of the system error signal SERR_ and is set high to enable the system error signal SERR_. The output of the OR gate 714 is connected to the input of a buffer 716, which drives the system error signal SERR_.

In the ensuing discussion, the system error signal SERR_ is assumed to be enabled, that is, the signal S_SERREN is set high. In parity mode, a parity error on either the processor data bus PD or on the memory data bus MD would cause the signal DMCPERR_ to be asserted low. This causes the system error signal SERR_ to be driven low. In ECC mode, however, the memory data parity error signal MDPARCHKD is disabled low. Instead, the error correction logic in the data buffers 212 and 213 are enabled to correct a single bit error or to detect a multiple bit error on the memory data bus MD. Thus, in ECC mode, the signal DMCPERR_ is asserted low when a parity error is detected on the processor data bus PD or if a single bit error or multiple bit error is detected on the memory data bus MD. In the case of the single bit error, the signal SBCE0_ is asserted low, which causes the NOR gate 712 to drive its output high. This effectively causes the state of the signal DMCPERR_ to be ignored. Consequently, a single bit error detected by the data buffer 212 or 213 does not cause the system error signal SERR_ to be asserted. However, the system error signal SERR_ is driven low in response to the detection of a multiple bit error. A system error signal SERR_ would also be asserted in response to a parity error on the PCI data bus PCIAD as indicated by the signal D_SERR_.

The CMC 210 drives the system error signal SERR_ to the PCI-EISA bridge 130 through connectors 224 and 114. On the falling edge of the signal SERR_, the PCI-EISA bridge 130 asserts a non-maskable interrupt (NMI) to the microprocessor 200, if the corresponding NMI logic is enabled. The microprocessor 200 is thus informed of a data error condition and responds by reaccessing the same locations in the memory array 214 that produced the data error.

Thus, a system has been described that performs error correction and detection of data read from memory in a computer system having a processor bus and a system bus. In the preferred embodiment, a pair of data buffers are used to interface between the memory and the processor data bus or the system data bus. Each data buffer receives half the data bits from the memory array, from the processor data bus, and from the system data bus. Each of the data buffers contains logic for performing error detection and correction. To enable error correction, check bits are generated by the data buffers in a write cycle to the memory. A feature of the present invention is that half the check bits are provided to one data buffer and the second half is provided to other data buffer. When a memory read cycle is performed, the retrieved check bits and data bits are examined according to the error correction algorithm to determine if a single bit correctable error has occurred. If so, the erroneous data bit is flipped. If a multiple bit error is detected, the microprocessor is interrupted to take appropriate remedial actions.

The foregoing disclosure and description of the invention are illustrative and explanatory thereof, and various changes in the size, shape, materials, components, circuit elements, wiring connections and contacts, as well as in the details of the illustrated circuitry and construction and method of operation may be made without departing from the spirit of the invention.

We claim:

1. A data error correction circuit for use in a computer system, the computer system having a memory connected to a first number of memory data bits and a second number of check bits, the error correction circuit comprising:

at least two data buffers, wherein each of said data buffers includes:
- a plurality of memory data pins for receiving a portion of said first number of memory data bits, wherein the number of memory data bits received by all of said data buffers is equal to said first number;
- a plurality of check bit pins for receiving a portion of said second number of said check bits, wherein the number of check bits received by all of said data buffers is equal to said second number;
- means coupled to said memory data pins and said check bit pins for generating a plurality of partial syndrome bits based on said received memory data bits and said received check bits;
- output means connected to said partial syndrome bit generating means for providing said plurality of partial syndrome bits to the other data buffers;
- means coupled to said output means of each of the other data buffers for receiving said partial syndrome bits provided by each of the other data buffers;
- means coupled to said partial syndrome bit generating means and to said receiving means for generating a plurality of fix bits based on said plurality of partial syndrome bits generated by said partial syndrome bit generating means and said partial syndrome bits received from the other data buffers, wherein said plurality of fix bits indicate which of said received memory data bits are erroneous; and
- means coupled to said plurality of memory data pins and coupled to said fix bit generating means for correcting said memory data bits received by said plurality of memory data pins based on said plurality of fix bits.

2. The error correction circuit of claim 1, wherein said portions of said first number of memory data bits received by each of said data buffers are equal, and wherein said portions of said second number of check bits received by each of said data buffers are equal.

3. The error correction circuit of claim 2, wherein there are only two data buffers, wherein said plurality of memory data pins receive half of said first number of memory data bits, and wherein said plurality of check bit pins receive half of said second number of check bits.

4. The error correction circuit of claims 1, 2, or 3, wherein said data bit correcting means is capable of correcting only a single-bit error in said first number of memory data bits and in said second number of check bits.

5. The error correction circuit of claim 1, wherein the number of said plurality of fix bits is equal to said first number, wherein each of said fix bits corresponds to one of said first number of memory data bits, wherein a fix bit being asserted indicates that said corresponding data bit is erroneous, and wherein said data bit correcting means includes:

means coupled to said memory data pins and coupled to said fix bit generating means for inverting the state of each of said received memory data bit whose corresponding fix bit is asserted.

6. The error correction circuit of claim 1, wherein the computer system further includes a processor bus, a microprocessor coupled to said processor bus and capable of generating a read request having a read address on said processor bus, and a memory controller coupled to said processor bus and coupled to the memory, wherein each of said data buffers are coupled to said processor bus, wherein said memory controller responds to said read request by performing a read access to the memory, wherein the memory responds to said read access by driving said first number of memory data bits and said second number of check bits, and wherein each of said data buffers further include:

output means coupled to said data bit correcting means for providing said corrected memory data bits to said processor bus.

7. The error correction circuit of claim 6, wherein said processor bus includes a plurality of processor data bits and a fourth number of processor parity bits, said processor parity bits for indicating if a parity error has occurred in said processor data bits, and wherein each of said data buffers further include:

a plurality of parity output pins for connection to a portion of said fourth number of processor parity bits, wherein the number of processor parity bits connected to said parity output pins of all of said data buffers is equal to said fourth number;

means coupled to said data error correcting means for generating corrected parity bits based on said corrected memory data bits received by said plurality of memory data pins; and means coupled to said corrected parity bit generating means and said parity output pins for providing said corrected parity bits to said plurality of parity output pins.

8. The error correction circuit of claim 6, wherein said data bit correcting means is capable of correcting only a single-bit error in said first number of memory data bits and said second number of check bits, and wherein each of said data buffers further include:

means coupled to said partial syndrome bit generating means and to said receiving means for asserting a multiple-bit error signal if a multiple-bit error in said first number of memory data bits and said second number of check bits is indicated by said partial syndrome bits generated by said partial syndrome bit generating means and said partial syndrome bits received from the other data buffers; and means coupled to said processor bus and to said multiple-bit error signal asserting means for providing an interrupt signal to said processor bus, said interrupt signal notifying said microprocessor of an uncorrectable data error condition.

9. The error correction circuit of claim 6, wherein the microprocessor is capable of generating a write request having a plurality of write data bits on said processor bus, wherein said memory controller responds to said write request by asserting a write access to the memory, wherein the memory responds to said write access by receiving said first number of memory data bits and said second number of check bits, wherein said plurality of memory data pins are bidirectional to allow the memory to drive said memory data bits, wherein said plurality of check bit pins are bidirectional to allow the memory to drive said check bits, and wherein each of said data buffers further include:

means coupled to said processor bus for receiving a portion of said write data bits, wherein the number of said write data bits received by said data buffers is equal to the total number of write data bits;

means coupled to said write data bit receiving means and said memory data pins for providing said received write data bits to said memory data pins;

means coupled to said write data bit receiving means for generating write check bits based on said received write data bits; and means coupled to said write check bit generating means and said check bit pins for providing said write check bits to said check bit pins.

10. A method of correcting a first number of memory data bits provided by a memory, the memory further providing a second number of check bits, wherein the first number of memory data bits and second number of check bits are connected to at least two data buffers, the method comprising the steps of:

receiving a portion of said first number of memory data bits at each of said data buffers, wherein the number of memory data bits received by all of said data buffers is equal to said first number;

receiving a portion of said second number of said check bits at each of said data buffers, wherein the number of check bits received by all of said data buffers is equal to said second number;

generating a plurality of partial syndrome bits based on said received memory data bits and said received check bits at each of said data buffers;

providing said plurality of partial syndrome bits to the other data buffers from each of said data buffers;

receiving said partial syndrome bits provided by each of the other data buffers at each of said data buffers;

generating in each of said data buffers a plurality of fix bits based on said plurality of partial syndrome bits generated in each of said data buffers and said partial syndrome bits received from the other data buffers, wherein said plurality of fix bits indicate which of said received memory data bits are erroneous; and correcting said received memory data bits based on said plurality of fix bits at each of said data buffers.

11. The method of claim 10, wherein said portions of said first number of memory data bits received by each of said data buffers are equal, and wherein said portions of said second number of check bits received by each of said data buffers are equal.

12. The method of claim 11, wherein there are only two data buffers, wherein each of said data buffers receives half of said first number of memory data bits and half of said second number of check bits.

13. The method of claims 10, 11, or 12, wherein said data buffers are capable of correcting only a single-bit error in said first number of memory data bits and in said second number of check bits.

14. The method of claim 10, wherein the number of said plurality of fix bits is equal to said first number, wherein each of said fix bits corresponds to one of said first number of memory data bits, wherein a fix bit being asserted indicates that said corresponding data bit is erroneous, and wherein said data bit correcting step includes:

inverting the state of each of said received memory data bits whose corresponding fix bit is asserted.

15. A computer system, comprising:

a memory data bus for transferring a first number memory data bits;

a check bit bus for transferring a second number of check bits;

a memory connected to said memory data bus and said check bit bus for receiving said first number of memory data bits and said second number of check bits;

at least two data buffers connected to said memory data bus and said check bit bus for receiving said first number of memory data bits and said second number of check bits, including:

a plurality of memory data pins for receiving a portion of said first number of memory data bits, wherein the number of memory data bits received by all of said data buffers is equal to said first number;

a plurality of check bit pins for receiving a portion of said second number of said check bits, wherein the number of check bits received by all of said data buffers is equal to said second number;

means coupled to said memory data pins and said check bit pins for generating a plurality of partial syndrome bits based on said received memory data bits and said received check bits;

output means connected to said partial syndrome bit generating means for providing said plurality of partial syndrome bits to the other data buffers;

means coupled to said output means of each of the other data buffers for receiving said partial syndrome bits provided by each of the other data buffers;

means coupled to said partial syndrome bit generating means and to said receiving means for generating a plurality of fix bits based on said plurality of partial syndrome bits generated by said partial syndrome bit generating means and said partial syndrome bits received from the other data buffers, wherein said plurality of fix bits indicate which of said received memory data bits are erroneous; and means coupled to said plurality of memory data pins and coupled to said fix bit generating means for correcting said memory data bits received by said plurality of memory data pins based on said plurality of fix bits.

16. The computer system of claim 15, wherein said portions of said first number of memory data bits received by each of said data buffers are equal, and wherein said portions of said second number of check bits received by each of said data buffers are equal.

17. The computer system of claim 16, wherein there are only two data buffers, wherein said plurality of memory data pins receive half of said first number of memory data bits, and wherein said plurality of check bit pins receive half of said second number of check bits.

18. The computer system of claims 15, 16, or 17, wherein said data bit correcting means is capable of correcting only a single-bit error in said first number of memory data bits and in said second number of check bits.

19. The computer system of claim 15, wherein the number of said plurality of fix bits is said first number, wherein each of said fix bits corresponds to one of said first number of memory data bits, wherein a fix bit being asserted indicates that said corresponding data bit is erroneous, and wherein said data bit correcting means includes:

means coupled to said memory data pins and coupled to said fix bit generating means for inverting the state of each of said received memory data bit whose corresponding fix bit is asserted.

20. The computer system of claim 15, further comprising:

a processor bus;

a microprocessor coupled to said processor bus and capable of generating a read request having a read address on said processor bus; and a memory controller coupled to said processor bus and coupled to said memory, wherein each of said data buffers are further coupled to said processor bus, wherein said memory controller responds to said read request by performing a read access to said memory, wherein said memory responds to said read access by driving said first number of memory data bits and said second number of check bits, and wherein each of said data buffers further include:

output means coupled to said data bit correcting means for providing said corrected memory data bits to said processor bus.

21. The computer system of claim 20, wherein said processor bus includes a plurality of processor data bits and a fourth number of processor parity bits, said processor parity bits for indicating if a parity error has occurred in said processor data bits, and wherein each of said data buffers further include:

a plurality of parity output pins for connection to a portion of said fourth number of processor parity bits, wherein the number of said fourth number of processor parity bits connected to said parity output pins of all of said data buffers is equal to said fourth number;

means coupled to said data error correcting means for generating corrected parity bits based on said corrected memory data bits received by said plurality of memory data pins; and means coupled to said corrected parity bit generating means and said parity output pins for providing said corrected parity bits to said plurality of parity output pins.

22. The computer system of claim 20, wherein said data bit correcting means is capable of correcting only a single-bit error in said first number of memory data bits and said second number of check bits, and wherein each of said data buffers further include:

means coupled to said partial syndrome bit generating means and to said receiving means for asserting a multiple-bit error signal if a multiple-bit error in said first number of memory data bits and said second number of check bits is indicated by said partial syndrome bits generated by said partial syndrome bit generating means and said partial syndrome bits received from the other data buffers; and means coupled to said processor bus and to said multiple-bit error signal asserting means for providing an interrupt signal to said processor bus, said interrupt signal notifying said microprocessor of an uncorrectable data error condition.

23. The computer system of claim 20, wherein said microprocessor is capable of generating a write request having a plurality of write data bits on said processor bus, wherein said memory controller responds to said write request by asserting a write access to said memory, wherein said memory responds to said write access by receiving said first number of memory data bits and said second number of check bits, wherein said plurality of memory data pins are bidirectional to allow said memory to drive said memory data bits, wherein said plurality of check bit pins are bidirectional to allow said memory to drive said check bits, and wherein each of said data buffers further include:

means coupled to said processor bus for receiving a portion of said write data bits, wherein the sum of said portions of said write data bits received by said data buffers is equal to the total number of write data bits;

means coupled to said write data bit receiving means and said memory data pins for providing said received write data bits to said memory data pins;

means coupled to said write data bit receiving means for generating write check bits based on said received write data bits;

and means coupled to said write check bit generating means and said check bit pins for providing said write check bits to said check bit pins.

* * * * *